(12) United States Patent
Nomura et al.

(10) Patent No.: US 6,989,849 B2
(45) Date of Patent: Jan. 24, 2006

(54) EXPOSURE HEAD AND IMAGE FORMING APPARATUS USING THE SAME

(75) Inventors: Yujiro Nomura, Nagano-Ken (JP); Atsunori Kitazawa, Nagano-Ken (JP); Kiyoshi Tsujino, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/637,709

(22) Filed: Aug. 11, 2003

(65) Prior Publication Data

US 2004/0125196 A1 Jul. 1, 2004

(30) Foreign Application Priority Data

Aug. 9, 2002 (JP) .............................. 2002-232519
Aug. 22, 2002 (JP) .............................. 2002-242213

(51) Int. Cl.
*B41J 2/385* (2006.01)
*G03G 13/04* (2006.01)

(52) U.S. Cl. ....................................... 347/133; 347/236
(58) Field of Classification Search ................ 347/118, 347/130, 133, 236, 238, 246
See application file for complete search history.

(56) References Cited

U.S. PATENT DOCUMENTS

| | | | | |
|---|---|---|---|---|
| 4,878,072 | A * | 10/1989 | Reinten | 347/236 |
| 5,482,896 | A * | 1/1996 | Tang | 438/28 |
| 5,955,837 | A * | 9/1999 | Horikx et al. | 313/506 |
| 6,266,074 | B1 | 7/2001 | Koumura et al. | |
| 6,430,325 | B1 * | 8/2002 | Shimoda | 385/14 |
| 2004/0007969 | A1 * | 1/2004 | Lu et al. | 313/501 |
| 2004/0101327 | A1 * | 5/2004 | Nomura et al. | 399/111 |

FOREIGN PATENT DOCUMENTS

| | | |
|---|---|---|
| EP | 1106366 A | 6/2001 |
| JP | 09-258505 A | 10/1997 |
| JP | 11-138899 A | 5/1999 |
| JP | 2002-38333 A | 9/2000 |

* cited by examiner

*Primary Examiner*—Ren Yan
*Assistant Examiner*—Leo T. Hinze
(74) *Attorney, Agent, or Firm*—Sughrue Mion, PLLC

(57) ABSTRACT

An exposure head is provided in which light beams from light emitting parts 63 pass through a transparent substrate 62 and are projected on an image carrier. The transparent substrate 62 has plain faces substantially parallel to each other, one of the faces being a face on which the light emitting parts 63 are formed and the other being a face from which light beams are projected. The transparent substrate 62 is provided, at position(s) other than the face on which the light emitting parts 63 are formed and than the face from which light beams are projected, with light quantity detecting means 100 for detecting the quantity of light emitted from said light emitting parts 63. In the exposure head in which the light emitting parts of organic EL light emitting elements are aligned into array configuration on the transparent substrate, the light quantity detecting means is disposed on an end face of the transparent substrate and light beams totally reflected at the projection-side face of the transparent substrate are introduced to the light quantity detecting means, thereby effectively detecting the quantity of light of the light emitting elements and thus providing improved accuracy of detecting the quantity of light.

20 Claims, 24 Drawing Sheets

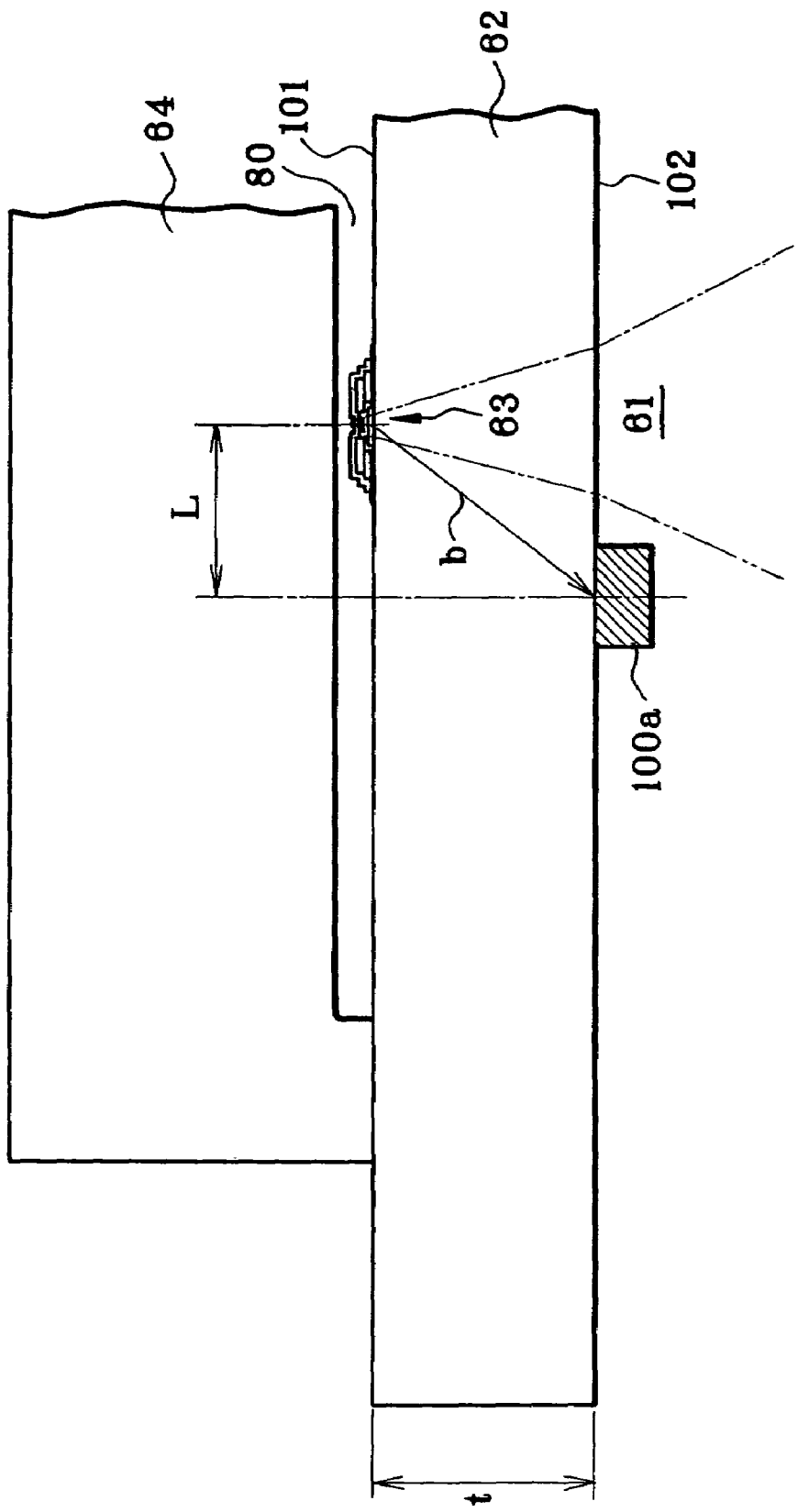

EXPOSURE HEAD AND IMAGE FORMING APPARATUS USING THE SAME

BACKGROUND OF THE INVENTION

The present invention relates to an exposure head, and an image forming apparatus using the same and, for example, to an exposure head in which organic EL light emitting elements as light emitting parts are aligned into an array configuration on a transparent substrate and an image forming apparatus which is miniaturized by employing the exposure head.

In conventional image forming apparatus, such as copying machines, printers, and facsimile machines, utilizing electrophotographic technology, it is common practice to employ a laser scanning optical system as light writing means (exposure means). Under such circumstances, an exposure means has been proposed in Japanese Patent Unexamined Publication No. H11-138899, which employs a single chip on which organic EL light emitting elements are integrated, thereby eliminating variation in light emitting characteristics and reducing the cost. In Japanese Patent Unexamined Publication No. 2000-238333, an exposure head has been proposed in which organic EL light emitting elements and light quantity sensors for measuring the quantity of emitted light are aligned into an array configuration on a same substrate, thereby preventing unevenness of density due to reduction in the quantity of emitted light.

As shown and described in the aforementioned prior publications, light beam emitted from a light emitting part the organic EL light emitting element is incident on a transparent substrate so that projected light is projected from a surface opposite to the surface on which the light emitting part is disposed. As shown in FIG. 16, when light beams are projected from the light emitting part 63 through the transparent substrate 62, light beams from the light emitting part 63 fall into light beams "a" projected from the surface 102 and light beams reflected at the surface 102. The light beams reflected at the projection side surface 102 further fall into light beams "b", which are incident on the projection side surface 102 at an angle greater than a critical angle "θC" and are thus totally reflected, and light beams "c", which are reflected at an angle less than or equal to the critical angle "θC". The reflectance of totally internally reflected light is 100%. Since the reflectance of light reflected at an angle less than the critical angle "θC" is 10% or less, the intensity of light beam "c" is significantly smaller than the intensity of the light beam "b". After reflected on the projection side surface 102, light beams "b" are incident on the opposite surface 101 on which the light emitting part 63 is disposed. If the opposite surface 101 and the projection side surface 102 are parallel to each other, the light beams are also incident on the opposite surface 101 at an angle greater than the critical angle "θC" and are thus totally internally reflected. In this manner, most of the light beams "b" are finally projected through the end faces of the transparent substrate 62 after being repeatedly totally reflected between the both surfaces 101 and 102 of the transparent substrate 62.

In case of Japanese Patent Unexamined Publication No. 2000-238333 as a prior art, since the light quantity sensors for measuring the quantity of light emitted from light emitting parts are disposed on the same surface on which the light emitting parts are disposed, detectable light beams are only light beams "c". Therefore, since the detected quantity of light may be poor, highly accurate detection is impossible. Accordingly, there is a problem that it is impossible to prevent unevenness of density with a high degree of accuracy.

SUMMERY OF THE INVENTION

The present invention has been made in consideration of these problems of the prior arts. Therefore, it is an object of the present invention to provide an exposure head, having light emitting parts such as organic EL light emitting elements which are aligned into an array configuration on a transparent substrate, in which light quantity detecting means are disposed on end faces of the transparent substrate such that light beams totally reflected at the projection side surface are introduced to the light quantity detecting means, thereby effectively detecting the quantity of light of the light emitting elements and thus improving the accuracy of detecting the quantity of light.

An exposure head of the first aspect of the present invention achieving the aforementioned object is an exposure head which has light emitting parts formed into an array configuration on a transparent substrate and projects modulated light beams from said light emitting parts to an image carrier so as to form a predetermined pattern on said image carrier, the light beams from said light emitting parts being projected on said image carrier side through said transparent substrate, wherein said transparent substrate has plane faces substantially parallel to each other, one of the faces being a face on which the light emitting parts are formed and the other being a face from which light beams are projected, and said transparent substrate is provided, at position(s) other than the face on which the light emitting parts are formed and than the face from which light beams are projected, with light quantity detecting means for detecting the quantity of light emitted from said light emitting parts.

In this case, it is advantageous that the light emitting parts are light emitting parts of organic EL light emitting elements.

The light quantity detecting means may be disposed on an end face, in the sub-scanning direction, of the transparent substrate.

Alternatively, the light quantity detecting means may be disposed on an end face, in the main scanning direction, of the transparent substrate.

In this case, light quantity detecting means are preferably disposed on both end faces, in the main scanning direction, of the transparent substrate.

Further, the light quantity detecting means may be disposed at a plurality of positions on the end faces of the transparent substrate.

Furthermore, it is preferable that end faces, on which no light quantity detecting means is disposed, of the transparent substrate have light reflectivity.

It is also preferable that the quantity of light emitted from each the light emitting part is corrected on the basis of a light quantity detected signal detected by the single light quantity detecting means or on the basis of a light quantity detected signal which is a total of light quantity detected signals detected by a plurality of the light quantity detecting means.

Moreover, it is preferable to provide a storage means of storing correction coefficients for correcting the quantities of light emitted from the light emitting parts.

The present invention includes a color image forming apparatus of a tandem type comprising at least two image forming stations each having a charging means, an exposure head as mentioned above, and a toner developing means, and a transfer means which are arranged around the image carrier, and forming a color image bypassing a transfer medium through the respective stations.

In case of comprising a fixing means of fusing and fixing a toner image transferred from the transfer medium to a recording medium, it is advantageous that the exposure head of the first aspect of the present invention is employed.

A storage means for storing correction coefficients for correcting the quantities of light emitted from the light emitting parts of the exposure head of the first aspect may be disposed on the image forming apparatus body side, not the exposure head side.

In the exposure head of the first aspect of the present invention, the transparent substrate has plane faces substantially parallel to each other, one of the faces being a face on which the light emitting parts are formed and the other being a face from which light beams are projected, and the transparent substrate is provided, at position(s) other than the face on which the light emitting parts are formed and than the face from which light beams are projected, with light quantity detecting means for detecting the quantity of light emitted from the light emitting parts. Therefore, it is possible to detect, at the position of the light quantity detecting means, light beams introduced by total internal reflection within the transparent substrate, thereby increasing the quantity of detected light and enabling the high-precision measurement of light quantity. As a result of this, even when there is variation in light emitting characteristic among the respective light emitting parts and/or even when the light emitting part(s) is deteriorated, uniform distribution of light quantity can be obtained by control. In addition, this structure can reduce the number of light quantity detecting means which are conventionally disposed corresponding to the respective light emitting parts, thereby simplifying the structure of the exposure head and reducing the cost.

An exposure head of the second aspect of the present invention achieving the aforementioned object is an exposure head which has light emitting parts formed into an array configuration on a transparent substrate and projects modulated light beams from said light emitting parts to an image carrier so as to form a predetermined pattern on said image carrier, the light beams from said light emitting parts being projected on said image carrier side through said transparent substrate, wherein said transparent substrate has plane faces substantially parallel to each other, one of the faces being a face on which the light emitting parts are formed and the other being a face from which light beams are projected, and said transparent substrate is provided, on the face on which the light emitting parts are formed, with light quantity detecting means for detecting the quantity of light emitted from said light emitting parts, said light quantity detecting means is positioned to satisfy a relation of the following equation:

$$L \geq 2t \cdot \tan \theta c \quad (1)$$

wherein the thickness of said transparent substrate is "t", the critical angle of said transparent substrate is "θc", and the distance between the center of the light emitting part nearest to said light quantity detecting means and the center of said light quantity detecting means is "L".

An exposure head of the third aspect of the present invention is an exposure head which has light emitting parts formed into an array configuration on a transparent substrate and projects modulated light beams from said light emitting parts to an image carrier so as to form a predetermined pattern on said image carrier, the light beams from said light emitting parts being projected on said image carrier side through said transparent substrate, wherein said transparent substrate has plane faces substantially parallel to each other, one of the faces being a face on which the light emitting parts are formed and the other being a face from which light beams are projected, and said transparent substrate is provided, on the face from which light beams are projected, with light quantity detecting means for detecting the quantity of light emitted from said light emitting parts, said light quantity detecting means is positioned to satisfy a relation of the following equation:

$$L \geq t \cdot \tan \theta c \quad (2)$$

wherein the thickness of said transparent substrate is "t" the critical angle of said transparent substrate is "θc", and the distance between the center of the light emitting part nearest to said light quantity detecting means and the center of said light quantity detecting means is "L".

In these cases, it is advantageous that the light emitting parts are light emitting parts of organic EL light emitting elements.

The light quantity detecting means may be disposed at a plurality of positions on the face on which the light emitting parts are formed or the face from which light beams are projected of the transparent substrate.

It is preferable that the quantity of light emitted from each light emitting part is corrected on the basis of a light quantity detected signal detected by the single light quantity detecting means or on the basis of a light quantity detected signal which is a total of light quantity detected signals detected by a plurality of the light quantity detecting means.

Moreover, it is preferable to provide a storage means of storing correction coefficients for correcting the quantities of light emitted from the light emitting parts.

The present invention includes a color image forming apparatus of a tandem type comprising at least two image forming stations each having a charging means, an exposure head as mentioned above, and a toner developing means, and a transfer means which are arranged around the image carrier, and forming a color image bypassing a transfer medium through the respective stations.

In case of comprising a fixing means of fusing and fixing a toner image transferred from the transfer medium to a recording medium, it is advantageous that the exposure head of the second aspect or the third aspect of the present invention is employed.

A storage means for storing correction coefficients for correcting the quantities of light emitted from the light emitting parts of the exposure head of the second aspect or the third aspect may be disposed on the image forming apparatus body side, not the exposure head side.

In the exposure head of the second aspect or the third aspect of the present invention, the transparent substrate has plane faces substantially parallel to each other, one of the faces being a face on which the light emitting parts are formed and the other being a face from which light beams are projected, and the transparent substrate is provided, on the face on which the light emitting parts are formed, with light quantity detecting means for detecting the quantity of light emitted from the light emitting parts so that the light quantity detecting means is positioned to satisfy the relation of the equation (1), or the transparent substrate is provided, on the face from which light beams are projected, with light quantity detecting means for detecting the quantity of light emitted from the light emitting parts so that the light quantity detecting means is positioned to satisfy the relation of the equation (2). Therefore, it is possible to detect, at the position of the light quantity detecting means, light beams to be introduced by total internal reflection within the transparent substrate, thereby increasing the quantity of detected light and enabling the high-precision measurement of light quantity. As a result, even when there is a variation in light emitting characteristics among the light emitting parts and/or even when some light emitting parts are deteriorated, uniform distribution of light quantity can be obtained by control. In addition, this structure can reduce the number of light quantity detecting means which are conventionally disposed corresponding to the respective light emitting parts, thereby simplifying the structure of the exposure head and reducing the cost.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 24 is a similar view as FIG. 20, but showing the case shown in FIG. 23.

DESCRIPTION OF THE PREFERRED EMBODIMENTS

Hereinafter, an embodiment of an image forming apparatus and an exposure head to be used in the apparatus according to the present invention will be described with reference to the attached drawings.

Figure 1:
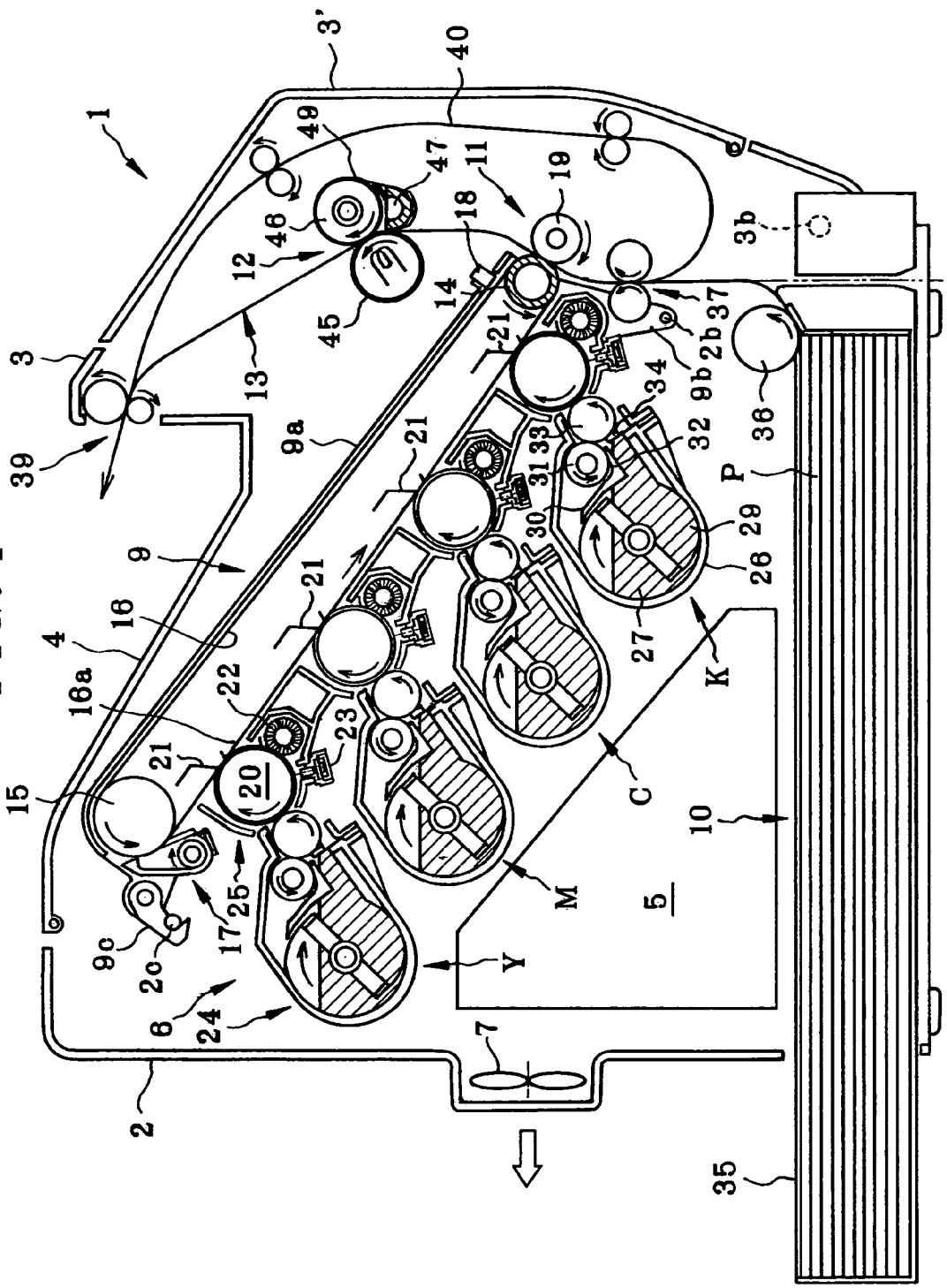
FIG. 1 is a schematic sectional view showing the entire structure of an embodiment of the image forming apparatus employing exposure heads (image writing means) of the present invention.

FIG. 1 is a schematic sectional view showing the entire structure of an embodiment of an image forming apparatus employing an exposure head (image writing means) of the present invention. This embodiment is of a type employing an intermediate transfer belt as a transfer belt.

In FIG. 1, the image forming apparatus 1 of this embodiment comprises a housing body 2, a first door member 3 which is disposed on the front of the housing body 2 such that the first door member is openable and closable, and a second door member (also functioning as an outfeed tray) 4 which is disposed on the top of the housing body 2 such that the second door member is openable and closable. The first door member 3 is provided with a lid 3' which is disposed such that the lid 3' is openable and closable relative to the front of the housing body 2. The lid 3' can be opened and closed in conjunction with or independently from the first door member 3.

Disposed in the housing body 2 are an electrical component box 5 in which substrates for power source circuits and substrates for control circuits are housed, an image forming unit 6, a blower fan 7, a transfer belt unit 9, and a paper feeding unit 10. Disposed in the first door member 3 are a secondary transfer unit 11, a fixing unit 12, and a recording medium carrying means 13. Expendable supplies in the image forming unit 6 and the paper feeding unit 10 are detachable relative to the body. In this case, as the transfer belt unit 9 is detached together with the expendable supplies, the maintenance and replacement are allowed.

The first door member 3 is attached to the lower front portion of the housing body 2 via pivotal shafts 3b disposed on both sides of the housing body 2 so that the first door member 3 is openable and closable about the pivotal shafts 3b.

In this embodiment, as will be described later, the respective units can be attached to and detached from the apparatus only by access from the front of the apparatus. This allows the apparatus to be placed in a narrow space.

In FIG. 1, the transfer belt unit 9 comprises a driving roller 14 which is disposed in a lower portion of the housing body 2 and is driven by a driving means (not shown) to rotate, a driven roller 15 which is disposed diagonally above the driving roller 14, an intermediate transfer belt 16 which is laid around the two rollers 14, 15 with some tension and is driven to circulate in a direction indicated by an arrow, and a cleaning means 17 which can abut on the surface of the intermediate transfer belt 16. The driven roller 15 and the intermediate transfer belt 16 are arranged obliquely to the upper left of the driving roller 14 in the drawing. Accordingly, during the operation of the intermediate transfer belt 16, a belt face 16a of which traveling direction is downward takes a lower side. In this embodiment, the belt face 16a is a tension side (side tensioned by the driving roller 14) at the time of driving the intermediate transfer belt.

The driving roller 14 and the driven roller 15 are rotatably supported by a support frame 9a which has a pivotal portion 9b formed at a lower end thereof. The pivotal portion 9b is fitted to a pivot shaft 2b disposed in the housing body 2, whereby the support frame 9a is attached to the housing body 2 such that it is pivotally movable. In addition, the support frame 9a has a lock lever 9c which is rotatably disposed at an upper end thereof. The lock lever 9c can latch a latch pin 2c disposed on the housing body 2.

The driving roller 14 also functions as a back-up roller for a secondary transfer roller 19 composing the secondary transfer unit 11. The driven roller 15 also functions as a back-up roller for the cleaning means 17. The cleaning means 17 is located at the belt face 16a side, of which traveling direction is downward.

On the back of the belt surface 16a, of which traveling direction is downward, of the intermediate transfer belt 16, primary transfer members 21 composed of leaf spring electrodes are disposed. The primary transfer members 21 are pressed into contact with the back of the intermediate transfer belt 16 by their elastic force at locations corresponding to image carriers 20 of respective image forming stations Y, M, C, and K, described later. A transfer bias is applied to each primary transfer member 21.

In proximity to the driving roller 14, a test pattern sensor 18 is attached to the support frame 9a of the transfer belt unit 9. The test pattern sensor 18 is a sensor for positioning of toner images of respective colors on the intermediate transfer belt 16 and for compensating color registration error and densities of images of the respective colors by detecting image density of toner images of the respective colors.

The image forming unit 6 comprises the image forming stations Y (for yellow), M (for magenta), C (for cyan), and K (for black) for forming multi-color images (in this embodiment, four-color images). Each image forming station Y, M, C, K has an image carrier 20 composed of a photosensitive drum, a charging means 22, image writing means 23, and developing means 24 which are arranged around the image carrier 20. Reference numerals for the charging means 22, the image writing means 23, and the developing means 24 of the image forming station Y are indicated on the drawings and the indication of the reference numerals for the other image forming stations is omitted because the image forming stations have the same structure. It should be understood that the image forming stations Y, M, C, K may be arranged in any order.

The image forming stations Y, M, C, K are disposed such that the respective image carriers 20 are in contact with the belt face 16a, of which traveling direction is downward, of the intermediate transfer belt 16. As a result of this, the image forming stations Y, M, C, K are arranged in an obliquely leftward direction relative to the driving roller 14 in the drawing. Each image carrier 20 is driven to rotate in the traveling direction of the intermediate transfer belt 16 as indicated by arrows.

The charging means 22 is a conductive brush roller which is connected to a high-voltage source and rotates at a peripheral speed about twice to triple the speed of the image carrier 20 as a photoreceptor in opposite direction with being in contact with the surface of the image carrier 20 so as to uniformly charge the surface of the image carrier 20. In case of an image forming apparatus of a cleaner-less type just like this embodiment, it is preferable that a bias of the same polarity as the polarity of charged toner is applied to the brush roller during non image forming, whereby residual toner adhering to the brush roller is emitted to the image carrier 20, is transferred to the intermediate transfer belt 16 at the primary transfer portion, and is collected by the cleaning means 17 of the intermediate transfer belt 16.

Since the charging means 22 enables charging of the surface of the image carrier with extremely small amount of electric current, the charging means never pollute inside and outside of the apparatus with large amount of ozone like in case of using a corona charging method. In addition, since the charging means 22 softly touch the image carrier 20, adhesion of toner remaining after transfer onto a charging roller which easily occurs in case of using a roller charging method hardly occurs, thereby ensuring the stability of the image quality and the reliability of the apparatus.

The image writing means 23 employs an organic EL array exposure head in which organic EL light emitting elements are aligned in line(s) in the axial direction of the image carrier 20, as will be described later. The organic EL array exposure head is more compact than a laser scanning optical system because of its short optical path length so that the organic EL array exposure head can be arranged in proximity to the image carrier 20, thereby miniaturizing the entire apparatus. In this embodiment, the image carrier 20, the charging means 22, and the image writing means 23 of each image forming station Y, M, C, K are united together into an image carrier unit 25 such that the image carrier unit 25 can be attached to and detached from the support frame 9a together with the transfer belt unit 9, thereby keeping the positions of the organic EL array exposure heads relative to the image carriers 20. When the image carrier unit 25 is replaced, the organic EL array exposure heads are also replaced together.

Then, details of the developing means 24 will be described by taking the image forming station K as an example. In this embodiment, since the image forming stations Y, M, C, K are obliquely arranged and the image carriers 20 are disposed to be in contact with the belt face 16a, of which traveling direction is downward, of the intermediate transfer belt 16, toner storage containers 26 are arranged obliquely downward to the lower left of the image carriers 20. For this, special structure is employed in the developing means 24.

That is, the developing means 24 each comprises the toner storage container 26 storing toner (indicating by hatching), a toner storage area 27 formed in the toner storage container 26, a toner agitating member 29 disposed inside the toner storage area 27, a partition 30 defined in an upper portion of the toner storage area 27, a toner supply roller 31 disposed above the partition 30, a blade 32 attached to the partition 30 to abut the toner supply roller 31, the development roller 33 arranged to abut both the toner supply roller 31 and the image carrier 20, and a regulating blade 34 arranged to abut the development roller 33.

The image carrier 20 is rotated in the traveling direction of the intermediate transfer belt 16. The development roller 33 and the supply roller 31 are rotated in a direction opposite to the rotational direction of the image carrier 20 as shown by arrows. On the other hand, the agitating member 29 is rotated in a direction opposite to the rotational direction of the supply roller 31. Toner agitated and scooped up by the agitating member 29 in the toner storage area 27 is supplied to the toner supply roller 31 along the upper surface of the partition 30. Friction is caused between the toner and the blade 32 so that mechanical adhesive force and adhesive force by triboelectric charging are created relative to the rough surface of the supply roller 31. By these adhesive forces, the toner is supplied to the surface of the development roller 33. The toner supplied to the development roller 33 is regulated into a coating layer having a predetermined thickness by the regulating blade 34. The toner layer as a thin layer is carried to the image carrier 20 so as to develop a latent image on the image carrier 20 at and near a nip portion which is a contact portion between the development roller 33 and the image carrier 20.

In this embodiment, the development roller 33 disposed facing the image carrier 20, the toner supply roller 31, and the contact portion of the regulating blade 34 relative to the development roller 33 are not submerged in the toner in the toner storage area 27. This arrangement can prevent the contact pressure of the regulating blade 34 relative to the development roller 33 from being varied due to the decrease of the stored toner. In addition, since excess toner scraped from the development roller 33 by the regulating blade 34 spills onto the toner storage area 27, thereby preventing filming of the development roller 33.

The contact portion between the development roller 33 and the regulating blade 34 is positioned below the contact portion between the supply roller 31 and the development roller 33. There is a passage for returning excess toner, which was supplied to the development roller 33 by the supply roller 31 but not transmitted to the development roller 33, and excess toner, which was removed from the development roller 33 by the regulating operation of the regulating blade 34, to the toner storage area 27 at the lower portion of the developing means. The toner returned to the toner storage area 27 is agitated with toner in the toner storage area 27 by the agitating member 29, and is supplied to a toner inlet near the supply roller 31 again. Therefore, the excess toner is let down to the lower portion without clogging the friction portion between the supply roller 31 and the development roller 33 and the contact portion between the development roller 33 and the regulating blade 34 and is then agitated with toner in the toner storage area 27, whereby the toner in the developing means deteriorates slowly so that portentous changes in image quality just after the replacement of the developing means is prevented.

The sheet supply unit 10 comprises a sheet cassette 35 in which a pile of recording media P are held, and a pick-up roller 36 for feeding the recording media P from the sheet cassette 35 one by one. The sheet cassette 35 and the pick-up roller 36 compose a paper feeding portion.

Arranged inside the first door member 3 are a pair of resist rollers 37 for regulating the feeding of a receiving medium P to the secondary transfer portion at the right time, a secondary transfer unit 11 as a secondary transfer means abutting on and pressed against the driving roller 14 and the intermediate transfer belt 16, a fixing unit 12, the recording medium carrying means 13, a pair of outfeed rollers 39, and a dual-side printing passage 40.

The fixing unit 12 comprises a fuser roller 45 which has a built-in heating element such as a halogen heater and which is freely rotatable, a pressure roller 46 pressing the fuser roller 45, a belt tensioning member 47 which is disposed to freely swing relative to the pressure roller 46, and a heat resistant belt 49 which is lied around the pressure roller 45 and the belt tensioning member 47. A color image secondarily transferred to a recording medium is fixed to the recording medium at the nip portion formed between the fuser roller 45 and the heat resistant belt 49 at a predetermined temperature. In this embodiment, the fixing unit 12 can be arranged in a space formed obliquely upward the intermediate transfer belt 16, that is, a space formed on the opposite side of the image forming unit 6 relative to the intermediate transfer belt 16. This arrangement enables the reduction in heat transfer to the electrical component box 5, the image forming unit 6, and the intermediate transfer belt 16, and lessens the frequency of taking the action for correcting color registration error.

The actions of the image forming apparatus as a whole will be summarized as follows:

(1) As a printing command (image forming signal) is inputted into the control circuit(s) in the electric component box 5 from a host computer (personal computer) (not shown) or the like, the image carriers 20 and the respective rollers of the developing means 24 of the respective image forming stations Y, M, C, K, and the intermediate transfer belt 16 are driven to rotate.

(2) The outer surfaces of the image carriers 20 are uniformly charged by the charging means 22.

(3) In the respective image forming stations Y, M, C, K, the outer surfaces of the image carriers 20 are exposed to selective light corresponding to image information for respective colors by the image writing means 23, thereby forming electrostatic latent images for the respective colors.

(4) The electrostatic latent images formed on the image carriers 20 are developed by the developing means 24 to form toner images.

(5) The primary transfer voltage of the polarity opposite to the polarity of the toner is applied to the primary transfer members 21 of the intermediate transfer belt 16, thereby transferring the toner images formed on the image carriers 20 onto the intermediate transfer belt 16 one by one at the primary transfer portions. According to the movement of the intermediate transfer belt 16, the toner images are superposed on the intermediate transfer belt 16.

(6) In synchronization with the movement of the intermediate transfer belt 16 on which primary images are primarily transferred, a receiving medium P accommodated in the sheet cassette 35 is fed to the secondary transfer roller 19 through the pair of resist rollers 37.

(7) The primary-transferred image meets with the receiving medium at the secondary transfer portion. A bias of the polarity opposite to the polarity of the primary-transferred image is applied by the secondary transfer roller 19 which is pressed against the driving roller 14 for the intermediate transfer belt 16 by the pressing mechanism, whereby the primary-transferred image is secondarily transferred to the receiving medium fed in the synchronization manner.

(8) Residual toner after the secondary transfer is carried toward the driven roller 15 and is scraped by the cleaning means 17 disposed opposite to the roller 15 so as to refresh the intermediate transfer belt 16 to allow the above cycle to be repeated.

(9) The receiving medium passes through the fixing means 12, whereby the toner image on the receiving medium is fixed. After that, the receiving medium is carried toward a predetermined position (toward the outfeed tray 4 in case of single-side printing, or toward the dual-side printing passage 40 in case of dual-side printing).

Figure 2:
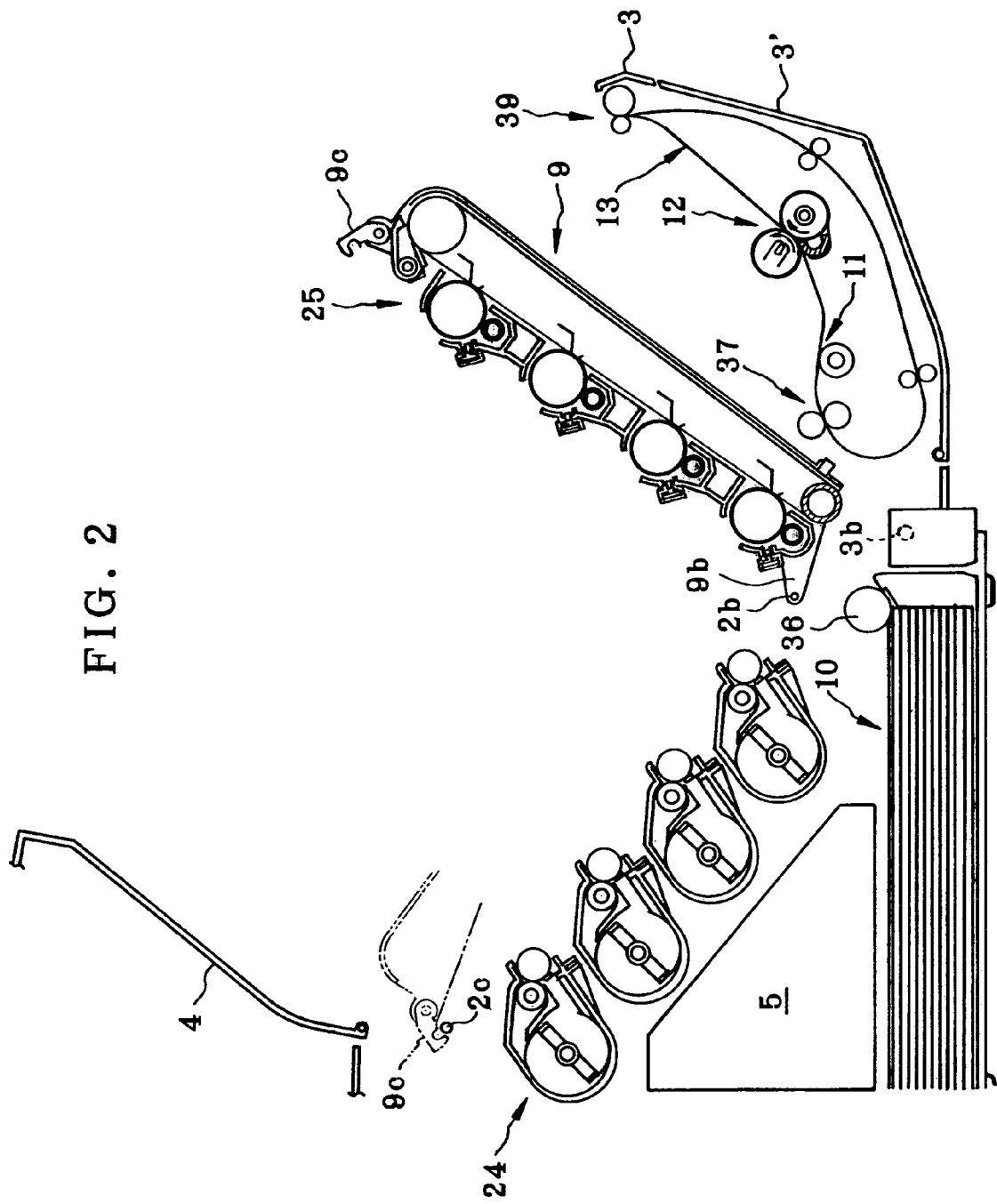
FIG. 2 is an illustration showing the apparatus shown in FIG. 1 in a state that a fixing unit, a secondary transfer unit, a transfer belt unit, an image carrier unit, and a developing means are exposed.
Figure 3:
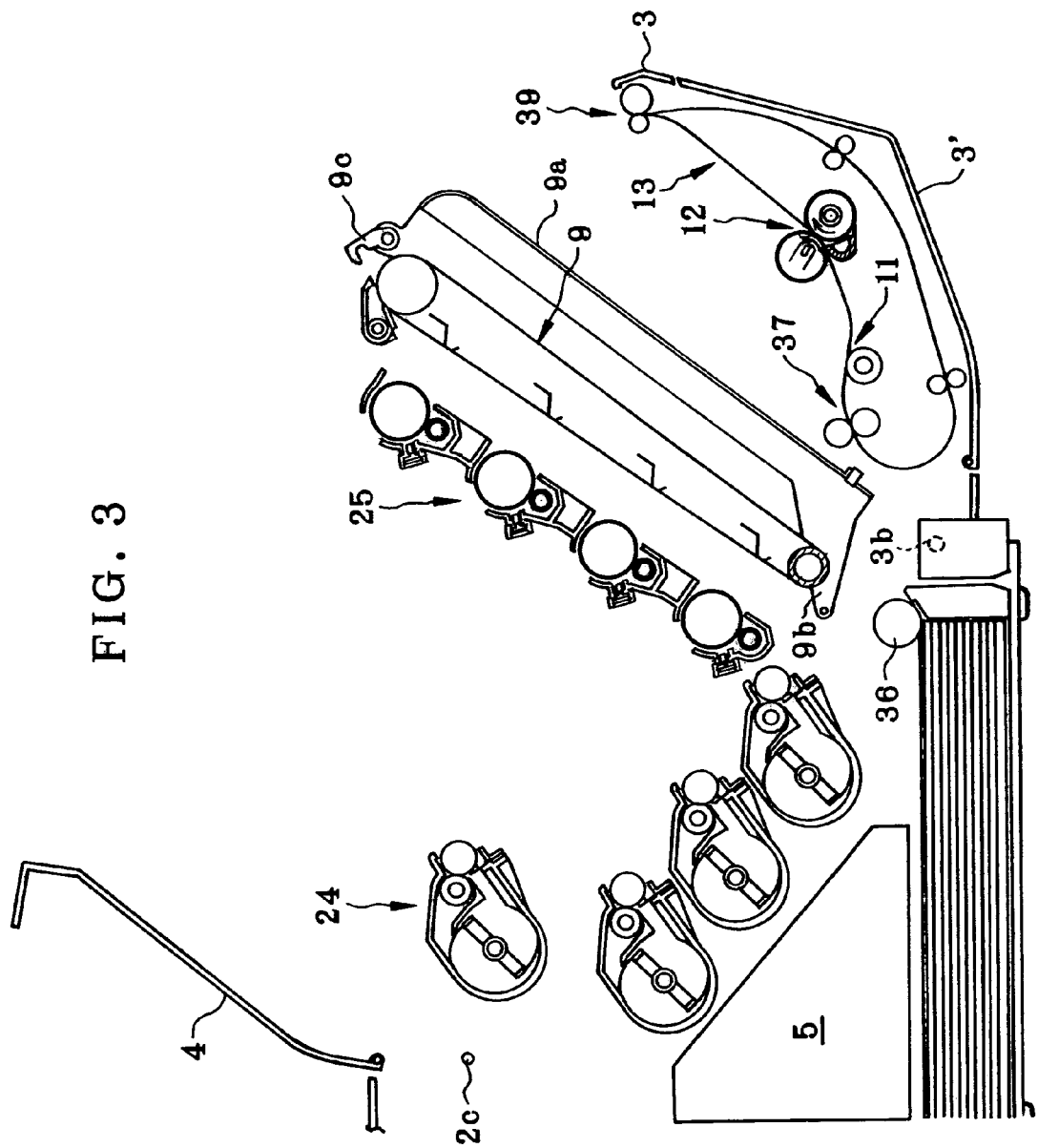
FIG. 3 is an illustration showing the apparatus in a state that the image carrier unit and the transfer belt unit are detached for replacement further from the state shown in FIG. 2.

Now, with reference to FIG. 2 and FIG. 3, the replacement of the expendable supplies and the removal of a jammed recording medium will be described. FIG. 2 shows a state that the first door member 3 is pivotally moved downwards about the pivotal shafts 3b together with the lid 3' to expose the fixing unit 12 and the secondary transfer unit 11. In addition, the lock lever 9c provided on the top of the frame 9a of the transfer belt unit 9 is pivotally moved to disengage itself from the latch pin 2c and the frame 9a is pivotally moved to the right about the pivot shaft 2b so as to expose the transfer belt unit 9 and the image carrier unit 25 which are supported by the frame 9a. The developing means 24 supported on the housing body 2 side can be exposed by the aforementioned operation. In this state, as shown in FIG. 3, the image carrier unit 25 and the transfer belt unit 9 can be detached from the frame 9a for replacement. In addition, the developing means 24 can be also independently and selectively replaced. Moreover, it is possible to remove recording media jammed within a feeding passage.

Figure 4:
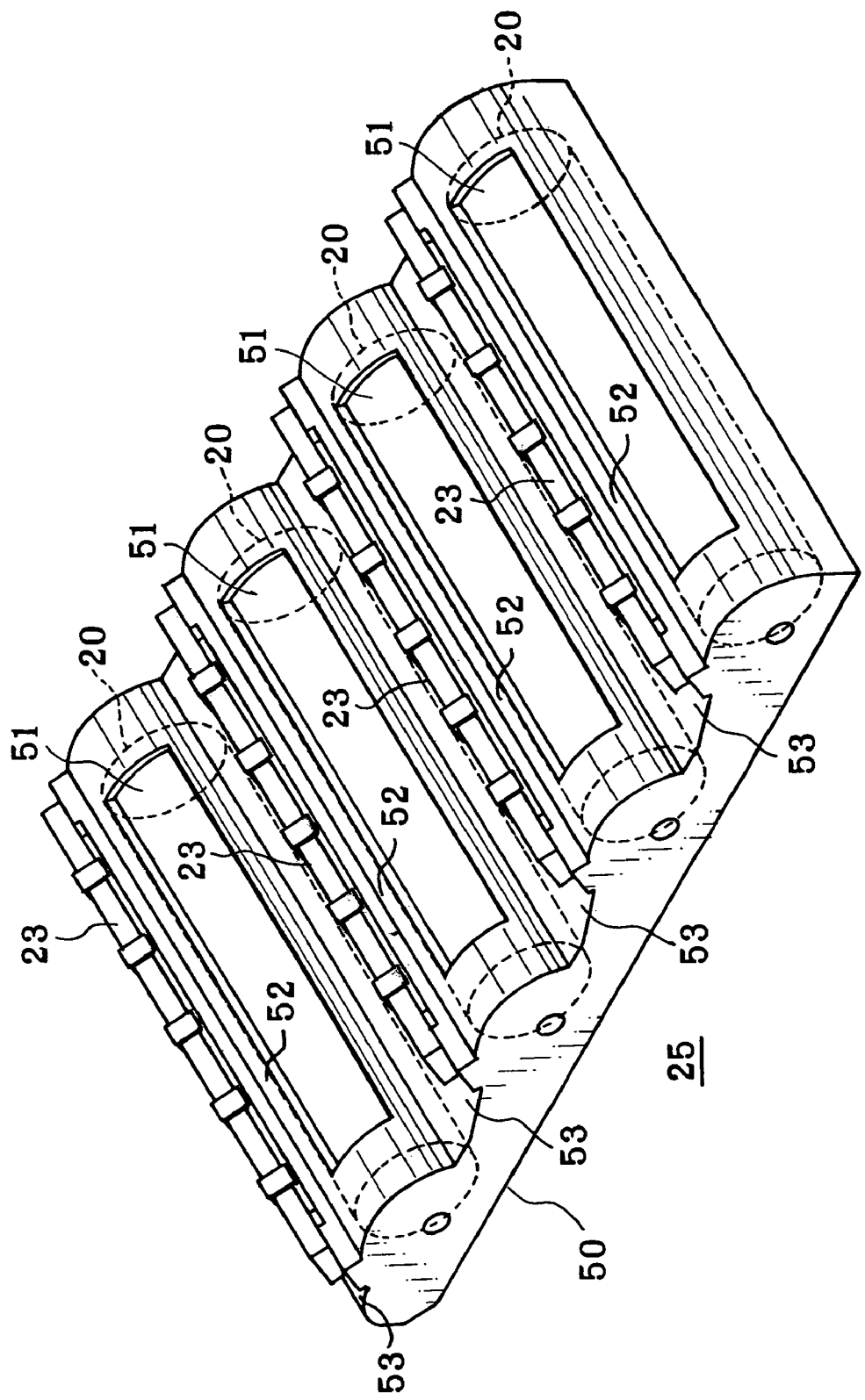
FIG. 4 is a perspective view of the image carrier unit to be used in the apparatus shown in FIG. 1 as seen from the developing means side.
Figure 5:
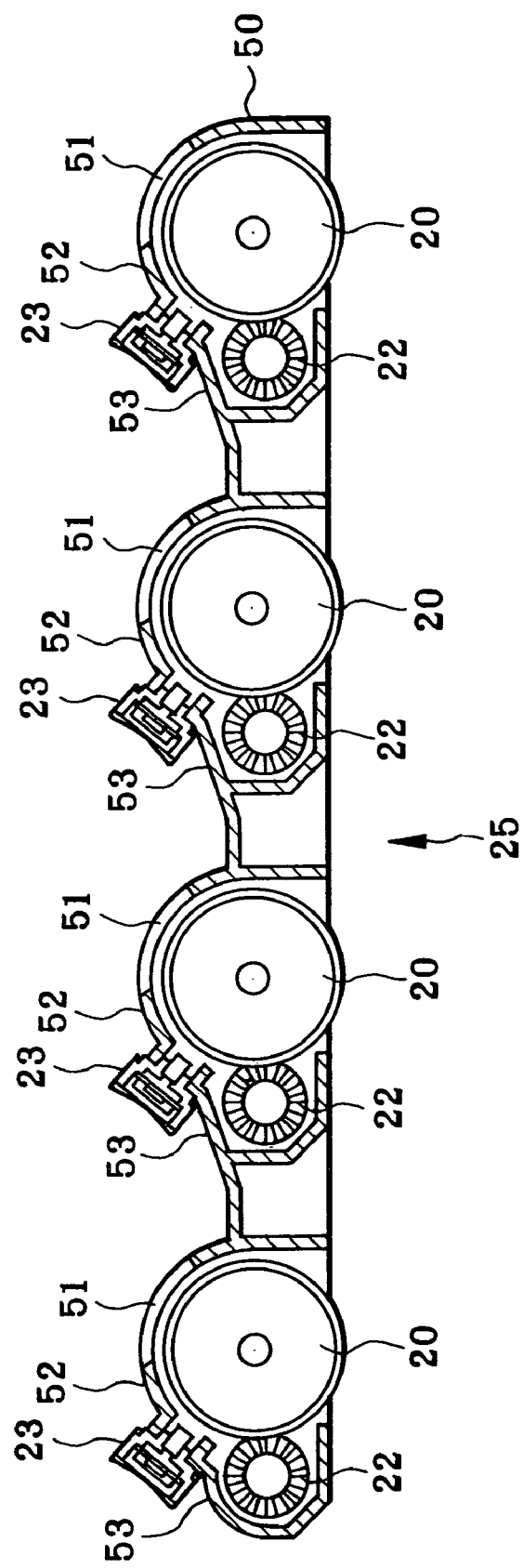
FIG. 5 is a sectional view of the image carrier unit shown in FIG. 4.

Hereinafter, an image carrier unit (image carrier cartridge) 25 in which the image carriers 20, the charging means 22, and the image writing means 23 of the respective image forming stations Y, M, C, and K are united together will be described with reference to FIG. 4 through FIG. 8. FIG. 4 is a perspective view of the image carrier unit 25 as seen from the developing means 24 side and FIG. 5 is a sectional view of the image carrier unit. The image carrier unit 25 comprises a casing 50 made of an opaque metallic plate or the like and having openings on a side confronting the intermediate transfer belt 16. In the casing 50, four image carriers (photosensitive drums) 20 of the image forming stations Y, M, C, and K are rotatably supported parallel to each other at certain intervals, conductive brush rollers as the charging means 22 are supported such that each charging means 22 rotates with being in contact with a predetermined position of each image carrier 20, organic EL array exposure heads as the image writing means 23 are positioned relative to the image carriers 20 and parallel to the image carriers 20 on downstream side than the charging means 22. Openings 51 are formed in the wall of the casing 50 on downstream side than the image writing means 23 so as to allow the developing rollers 33 of the developing means 24 to be in contact with the image carriers 20, respectively. Between each opening 51 and each image writing means 23, a shielding portion 52 of the casing 50 remains. Between each charging means 22 and each image writing means 23, a shielding portion 53 of the casing 50 remains. As will be described later, the shielding portions 52, 53, particularly the shielding portion 52 between the opening 51 and the image writing means 23, prevent ultraviolet rays from reaching the light emitting parts made of organic EL material from outside.

Figure 6:
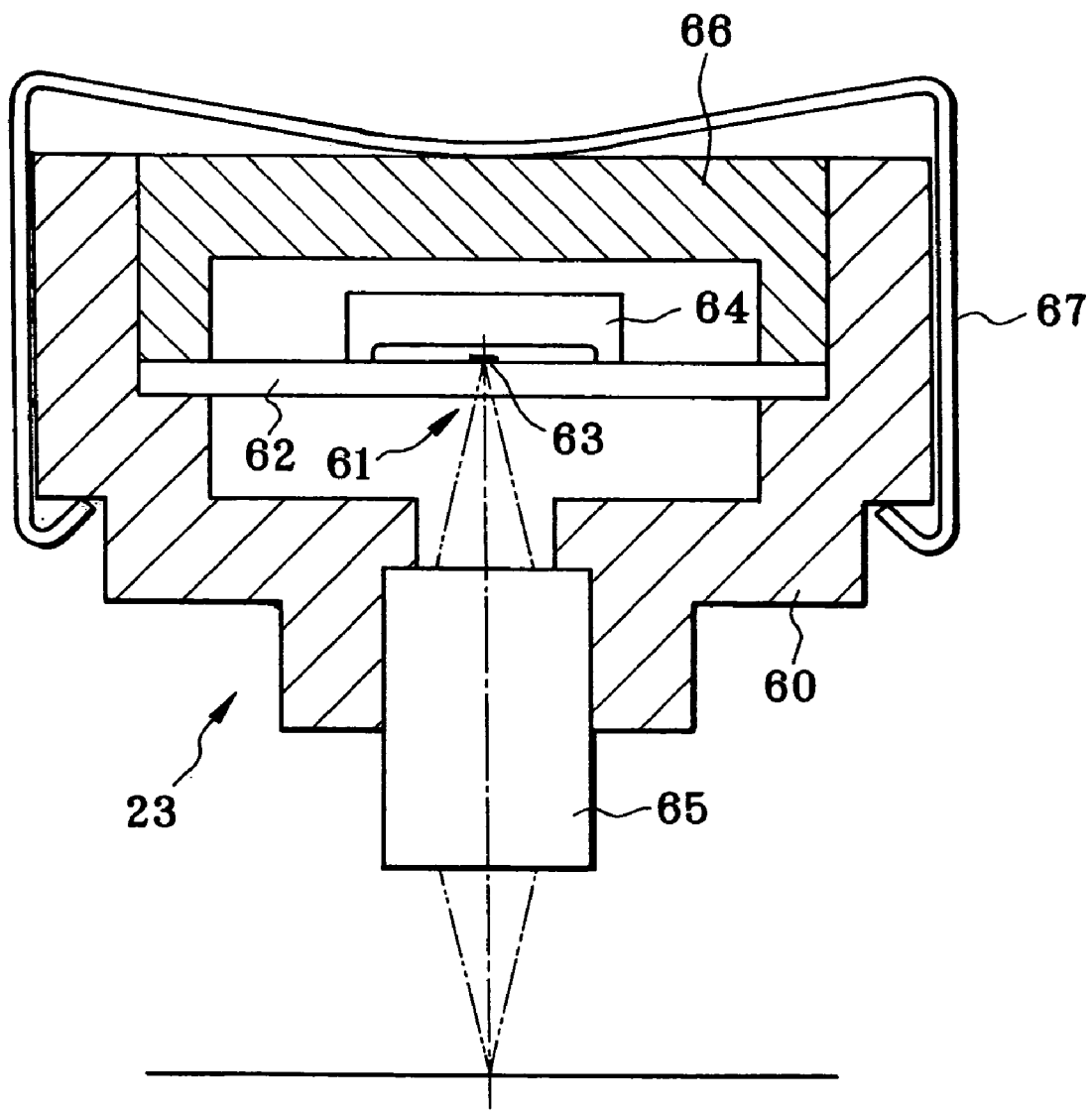
FIG. 6 is a sectional view showing an image writing means to be used in the image carrier unit shown in FIG. 4.

FIG. 6 is a sectional view of one of the image writing means 23. The image writing means 23 comprises an opaque housing 60 having a gradient index type rod lens array 65 which is composed of gradient index type rod lenses 65' (FIG. 8) aligned in zigzag fashion and is disposed on the central portion to face the image carrier 20 to allow the passage of light inside and outside, an organic EL light emitting element array 61 mounted in the housing to face the back of the gradient index type rod lens array 65, and an opaque cover 66 for shielding the organic EL light emitting element array 61 from the back of the housing 60. The cover 66 is pressed against the back of the housing 60 by a tie spring 67 so as to light-tightly seal the inside of the housing 60.

Figure 7:
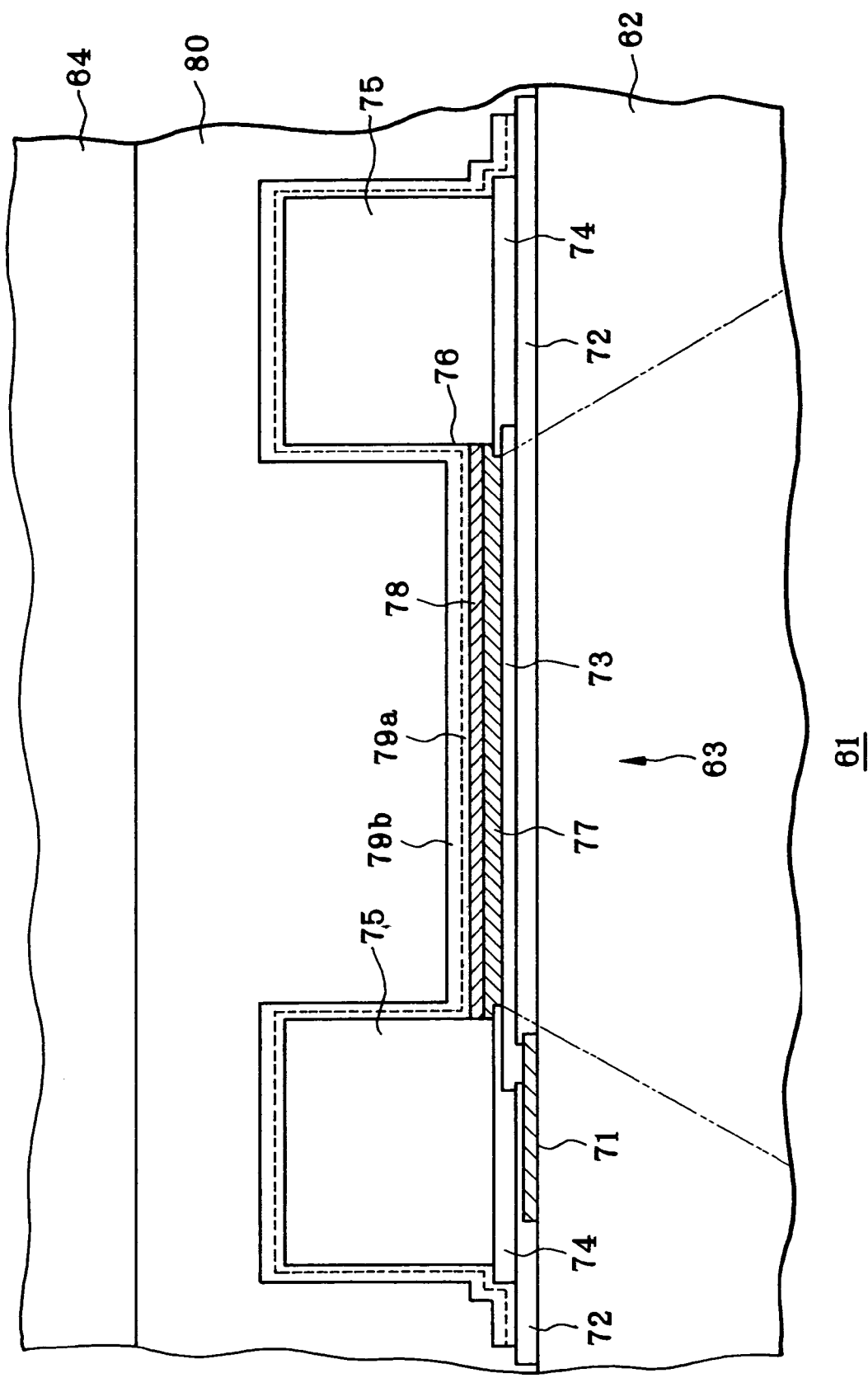
FIG. 7 is a sectional view showing an example of a portion near a light emitting part of an organic EL light emitting element array of the image writing means shown in FIG. 6.

FIG. 7 is a sectional view showing an example of a portion near a light emitting part 63 of the organic EL light emitting element array 61 of the image writing means 23 shown in FIG. 6. The organic EL light emitting element array 61 comprises a glass substrate 62, for example, of 0.5 mm in thickness, and TFTs (thin film transistors) 71 each of which controls the light emission of each light emitting part 63 and is made of polysilicon to have a thickness of 50 nm. The TFTs 71 are provided corresponding to the light emitting parts 63, respectively, which are aligned in two lines in zigzag fashion, at positions out of the light emitting parts 63. Formed on the glass substrate 62 except contact holes above the TFTs 71 is an insulating film 72 made of $SiO_2$ to have a thickness of about 100 nm. Positive electrodes 73 having a thickness of 150 nm made of ITO are formed on portions corresponding to the light emitting parts 63 in such a manner that the positive electrode 73 can be in contact with the TFT 71 through the contact hole. Then, another insulating film 74 made of $SiO_2$ having a thickness of about 120 nm is formed on portions corresponding to positions other than the light emitting parts 63. Formed on the insulating films 74 are banks 75 made of polyimide having a thickness of 2 $\mu$m and having holes 76 which are formed corresponding to the light emitting parts 63. In each of the holes 76 of the bank 75, starting from the positive electrode 73, a hole injection layer 77 having a thickness of 50 nm and a light emitting layer 78 having a thickness of 50 nm are formed. Further, a first negative electrode layer 79a made of Ca having a thickness of 100 nm and a second negative electrode layer 79b made of Al having a thickness of 200 nm are successively formed to cover the upper surfaces of the light emitting layers 78, the inner surfaces of the holes 76, and the outer surfaces of the banks 75. Furthermore, a glass cover 64 having a thickness of about 1 mm is provided on the negative electrode layers via inert gas such as nitrogen gas 80. In this manner, the light emitting parts 63 of the organic EL light emitting element array 61 are formed. Light emission of the light emitting parts 63 is carried out on the glass substrate 62 side.

Regarding materials used to form the light emitting layer 78 and the hole injection layer 77, it is possible to use various publicly known materials, for example, those disclosed in Japanese Patent Unexamined Publications No. H10-12377 and No. 2000-323276. Detailed description thereof is omitted herein.

Figure 8:
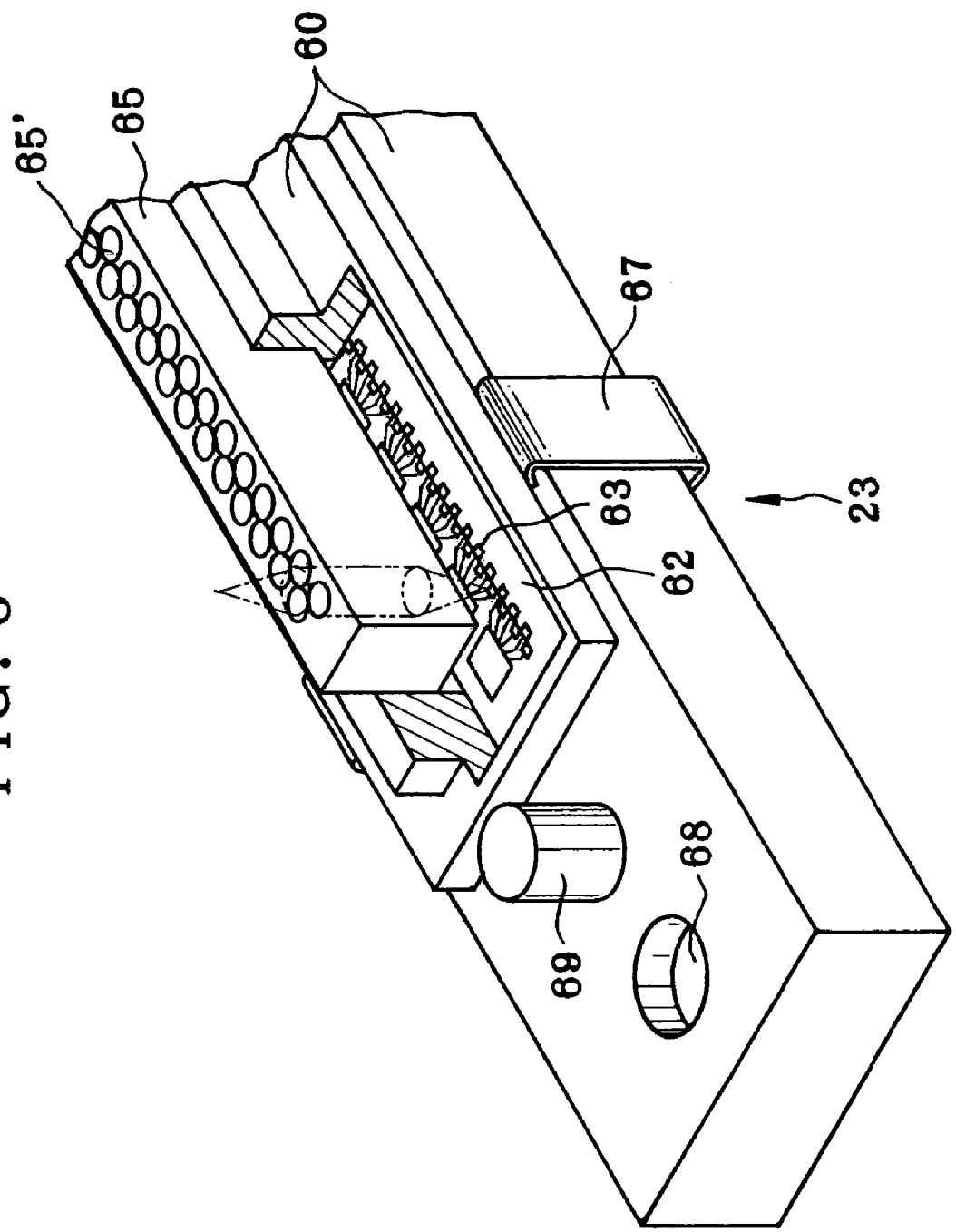
FIG. 8 is a perspective view showing an example of a mechanism for accurately positioning the image writing means relative to the image carrier attached to the image carrier unit.

FIG. 8 shows an example of a mechanism for positioning the image writing means 23 relative to the image carrier (photosensitive drum) 20 attached to the image carrier unit 25. The image carrier 20 is rotatably attached to the casing 50 of the image carrier unit 25 by its shaft. On the other hand, the organic EL light emitting element array 61 is held in the housing 60 having a long rectangular shape as shown in FIG. 6. Positioning pins 69 which are disposed on both end portions of the long housing 60 are fitted in corresponding positioning holes of the casing 50. Then, fixing screws are screwed into the screw holes of the casing 50 through holes 68 formed in the both end portions of the long housing 60, thereby fixing the long housing 60. In this manner, the image writing means 23 are fixed at the predetermined positions, respectively.

As shown in FIG. 2 and FIG. 3, when the developing means 24 are detached from the image carrier unit 25 to expose the image carrier unit 25 to outside light for the purpose of replacement of the expendable supplies or process for removing a jammed paper, ultraviolet rays from fluorescent lights and/or sunlight enter into the casing 50 through the openings 51 of the image carrier unit 25. Since the shielding portions 52 of the casing 50 remain between the openings 51 and the image writing means 23, the ultraviolet rays are prevented from being directly incident on the exposing positions and reflected at the image carriers 20 and thus prevented from reaching the light emitting parts 63 of the organic EL light emitting array 61 in the image writing means 23 via the gradient index type rod lens array 65. In addition, ultraviolet rays entering through openings on the side of the casing 50 confronting the intermediate transfer belt 16 are shielded by the charging means 22 and the shielding portions 53 of the casing 50 between the charging means 22 and the image writing means 23, thereby also preventing the ultraviolet rays from reaching the light emitting parts 63. By applying black paint, capable of absorbing ultraviolet rays, on the inner surfaces of the casing 50, the aforementioned action of shielding ultraviolet rays can be ensured.

On the other hand, since the housing 60 of the image writing means 23 is opaque and the back of the housing 60 is covered by the opaque cover 66, ultraviolet rays from fluorescent lights and/or sunlight being incident on the back of the organic EL light emitting element arrays 61 are prevented from reaching the light emitting parts 63 of the organic EL light emitting element arrays 61.

Therefore, even when the image carrier unit 25 is exposed to ultraviolet rays for the purpose of replacing the expendable supplies or removing a jammed paper, ultraviolet rays are prevented from reaching the light emitting parts 63 of the organic EL light emitting element arrays 61 in the image writing means 23 which are united into the image carrier unit 25, thereby preventing the organic EL light emitting elements from being deteriorated due to ultraviolet rays.

Figure 9:
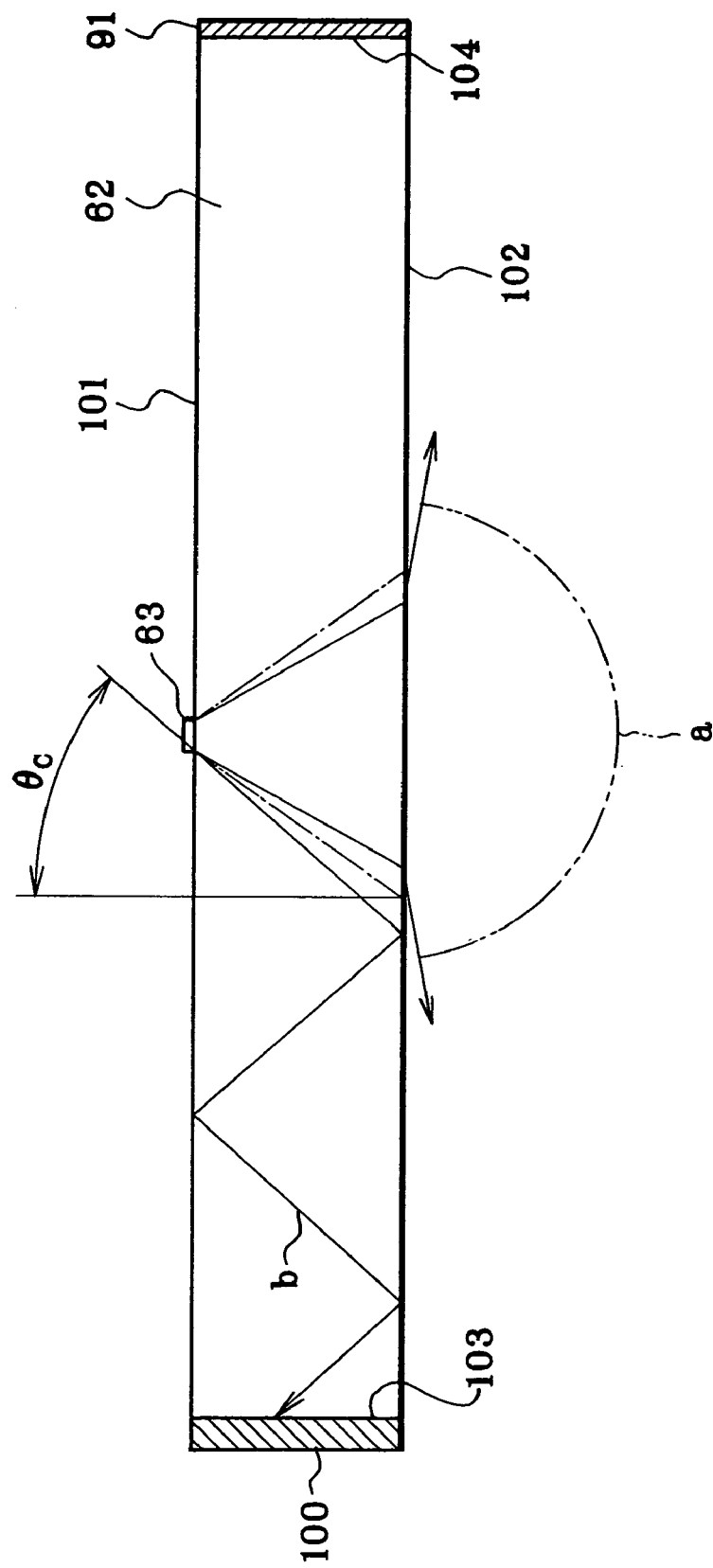
FIG. 9 is a sectional view of a glass substrate for the organic EL light emitting element array in the sub-scanning direction.
Figure 10:
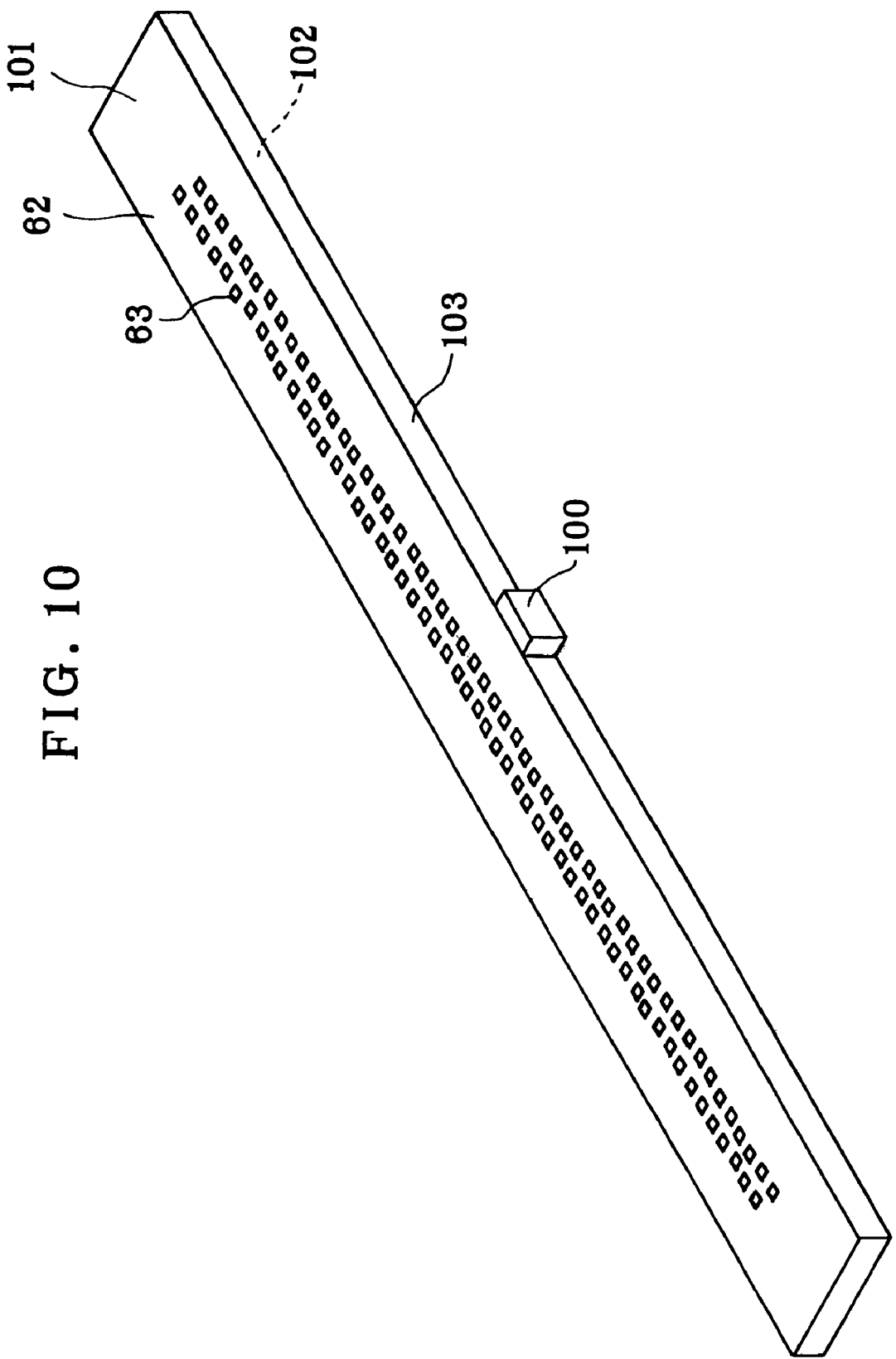
FIG. 10 is a perspective view of FIG. 9.

In the image writing means 23, light quantity detecting means for detecting the quantity of light emitted from the light emitting part 63 of each organic EL light emitting element will be described. FIG. 9 is a sectional view of the glass substrate 62 of the organic EL light emitting element array 61 of the image writing means 23 in the sub-scanning direction. Regarding to the organic EL light emitting element array 61, only one light emitting part 63 is shown in this drawing. The sub-scanning direction means a direction perpendicular to the rotational axis of the image carrier 20 and the main scanning direction as will be described later means a direction parallel to the rotational axis of the image carrier 20. FIG. 10 is a perspective view thereof.

Figure 11:
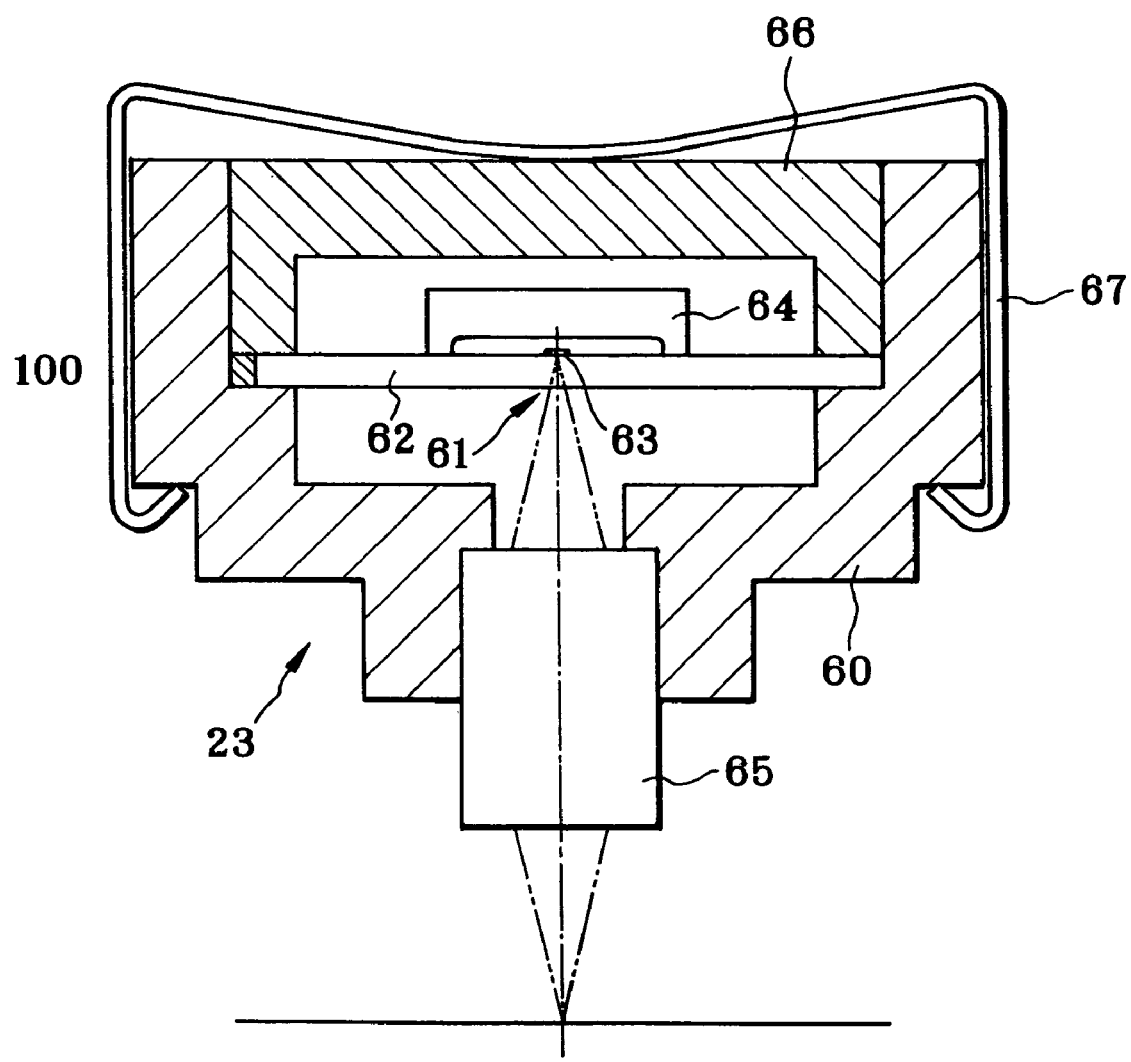
FIG. 11 is a sectional view of image writing means in case shown in FIG. 9 and FIG. 10.
Figure 12:
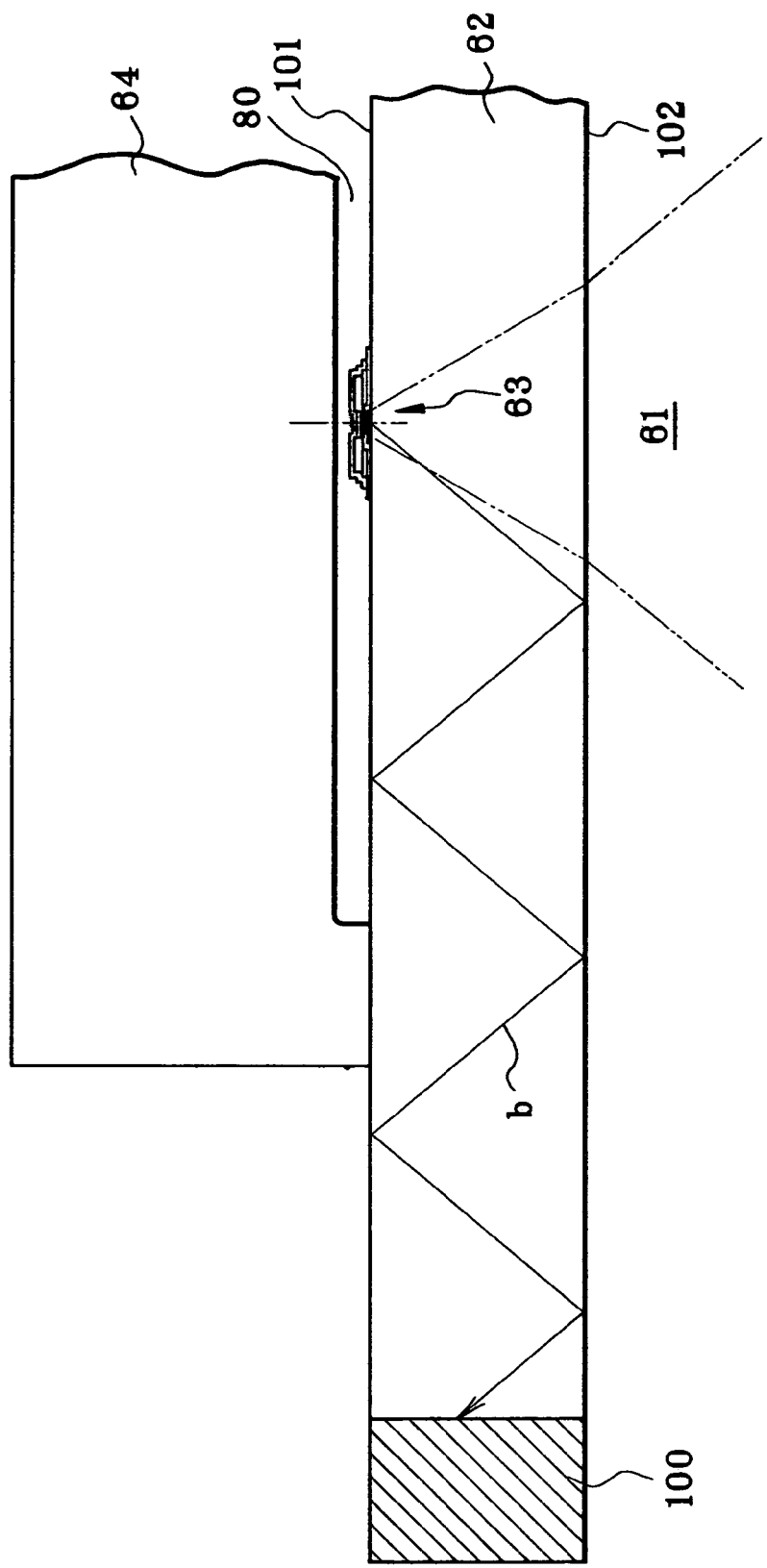
FIG. 12 is a sectional view of a portion from the vicinity of a light emitting part of the organic EL light emitting element array to a light quantity sensor of the image writing means shown in FIG. 11.
Figure 16:
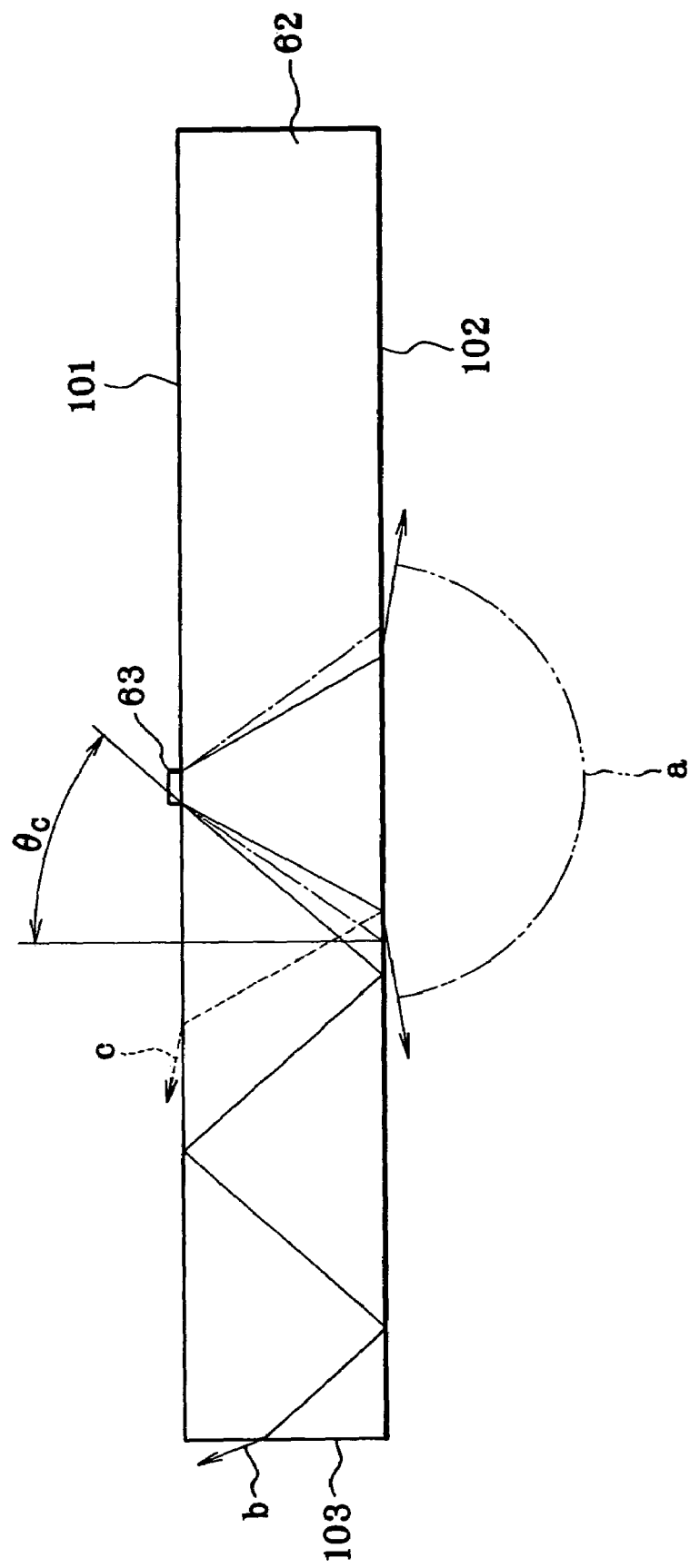
FIG. 16 is an illustration for explaining the course of light beams emitted from a light emitting part of an organic EL light emitting element.

As described with regard to FIG. 16, when light beams are projected from the light emitting part 63 through the transparent substrate 62, light beams from the light emitting part 63 fall into light beams "a" projected from the projection-side surface 102 of the transparent substrate 62 and light beams "b" which are incident on the projection side surface 102 at an angle greater than a critical angle "θC" and are thus totally reflected. The middle of the light beams "a" is used for exposing the image carrier 20 through the gradient index type rod lens array 65 (FIG. 6, FIG. 8). On the other hand, light beams "b" are repeatedly totally reflected between the both surfaces 101 and 102 of the transparent substrate 62 and become no use. Here, a light quantity sensor 100 composed of photo acceptance unit such as photodiode is attached to a predetermined location (substantially the center in FIG. 10) of the end face 103, in the sub-scanning direction, of the glass substrate 62 of the organic EL light emitting element array 61 so that light beams "b" introduced within the transparent substrate 62 from the light emitting part 63 by the total internal reflection are incident on the light quantity sensor 100, thereby detecting the relative quantity of light emitted from the light emitting part 63. FIG. 11 is a sectional view similar to FIG. 6, but showing the image writing means 23 in this case. FIG. 12 is a sectional view of a portion from the vicinity of a light emitting part 63 of the organic EL light emitting element array 61 to the light quantity sensor 100 of the image writing means 23 shown in FIG. 11.

On another end face 104, in the sub-scanning direction, opposite to the face on which the light quantity sensor 100 is disposed, a light reflective layer 91 made of a metal or the like is preferably disposed. The light reflective layer 91 reflects light beams introduced to the end face 104 in such a manner as to return the light beams toward the end face 103, on which the light quantity sensor 100 is disposed, after repeatedly reflected, thereby increasing the quantity of light being incident on the light quantity sensor 100.

Now, description will now be made as regard to an example of the method for preventing the unevenness of density of each light emitting part 63 by stably controlling the light quantity of each light emitting part 63 of the organic EL light emitting element array 61 based on the light quantity data detected by the light quantity sensor 100.

First, before shipment of the image carrier unit 25, the quantity of light reaching the position of the image carrier 20 from the organic EL light emitting element array 61 of the image writing means 23 through the gradient index type rod lens array 65 is measured for every light emitting part 63. For this, the image writing means 23 is fixed to a test jig. Disposed on the test jig is a light quantity detecting device for detecting, at an image position corresponding to the image carrier 20, the quantity of light emitted from the light emitting part 63 of each light emitting element of the organic EL light emitting element array 61. The light quantity detecting device may comprise a single detector which sequentially detects the quantity of light emitted from the light emitting parts 63, respectively, while moving along the organic EL light emitting element array 61 and may comprise detectors, of which number is the same as the light emitting parts 63, disposed corresponding to the light emitting parts 63. Then, the respective light emitting parts 63 are turned on to emit light one by one to obtain a value "Phn" ("n" means the n-th light emitting part 63) detected by the light quantity sensor 100 of the image writing means 23 and a value "Pgn" detected by the light quantity detecting device fixed to the test jig. Then, the correction coefficient Pgn/Phn of each light emitting part 63 is calculated.

The aforementioned measurement of the light quantity and the calculation of the correction coefficient are conducted for every light emitting part 63 of light emitting elements, thus obtaining the respective correction coefficients Pgn/Phn of all light emitting elements.

Figure 13:
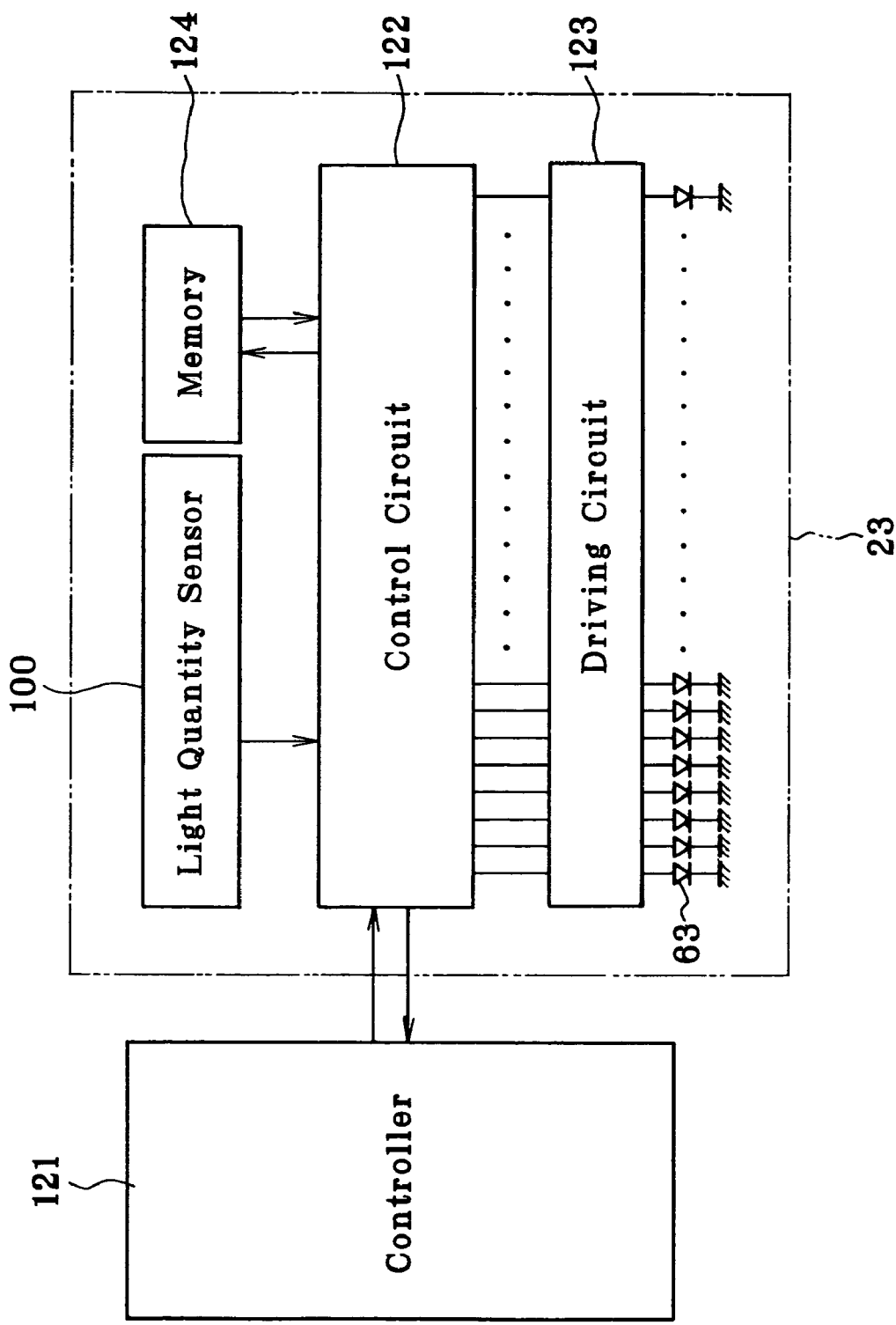
FIG. 13 is a block diagram of a control part for conducting the correction of the light emitting quantities of the respective light emitting parts.

The respective correction coefficients Pgn/Phn obtained in this manner are stored in a memory 124 arranged in the image writing means 23 as shown in a block diagram of FIG. 13. The correction of the light emitting quantity of each light emitting part 63 is conducted in the image forming apparatus 1 as shown in FIG. 1 by using the respective correction coefficients Pgn/Phn stored in the memory 124. Hereinafter, one example of the correction method will be described.

The respective light emitting parts 63 of the organic EL light emitting element array 61 of each image writing means 23 are turned on to emit light via a control circuit 122 and a driving circuit 123 based on the initial value data stored in the memory 124. The light quantity at this time is measured by the light quantity sensor 100. The light quantity at the image position of each light emitting part is calculated by multiplying the measured light quantity by the correction coefficient Pgn/Phn.

A difference is obtained by comparing the calculated light quantity to the desired light quantity given by a controller 121 of the electrical component box 5. Based on the difference, for example, the volume of current to be supplied to the light emitting element of the organic EL light emitting element array 61 is controlled so that the light emitting quantity of each light emitting part 63 is adjusted to be desired light quantity. This adjusting operation is repeatedly conducted for every light emitting element, whereby the light quantities of all of the light emitting elements are adjusted to the desired value.

The aforementioned light quantity correction operation can be conducted according to the command from the controller 121 at any point in time just after the start-up of the image forming apparatus 1, just before printing operation, a period until the next paper.

Instead of obtaining and storing the correction coefficient Pgn/Phn into the memory 124 before the shipment of the image carrier unit 25, each light emitting part 63 of each light emitting element may be turned on in such a manner that the light quantity emitted from the light emitting part 63 becomes the desired light quantity at the image position corresponding to the image carrier 20, that is, in such a manner that the "Pgn" becomes a predetermined value, and the value "Phn" detected by the light quantity sensor 100 at this time may be stored. In this case, each light emitting part 63 is turned on according to the initial value data stored in the memory 124 so as to obtain the value measured by the light quantity sensor 100. By controlling, for example, the volume of current to be supplied to the light emitting element of the organic EL light emitting element array 61 to eliminate a difference between the measured value and the "Phn" stored in the memory 124, the quantity of light emitted by each light emitting part 63 is adjusted to be the desired quantity.

Though the memory 124 in which the correction coefficient Pgn/Phn of each light emitting part 63 or the value Phn detected by the light quantity sensor 100 when the light emitting parts emit light of desired quantity are stored is arranged in the image writing means 23 as the aforementioned embodiments, the memory 124 may be connected to the controller 121 of the electrical component box 5 of the apparatus body and arranged on the apparatus body side.

As the correction coefficient Pgn/Phn of each light emitting part 63 or the value Phn when the light emitting parts emit light of desired quantity are stored in the image writing means 23 or the apparatus body, even when there is variation in light emitting characteristic among the respective light emitting parts 63 and/or even when the organic EL light emitting element is deteriorated with ultraviolet rays of outside light or with heat such as from a heat source of the fixing unit 12, uniform distribution of light quantity can be obtained by control.

Figure 14:
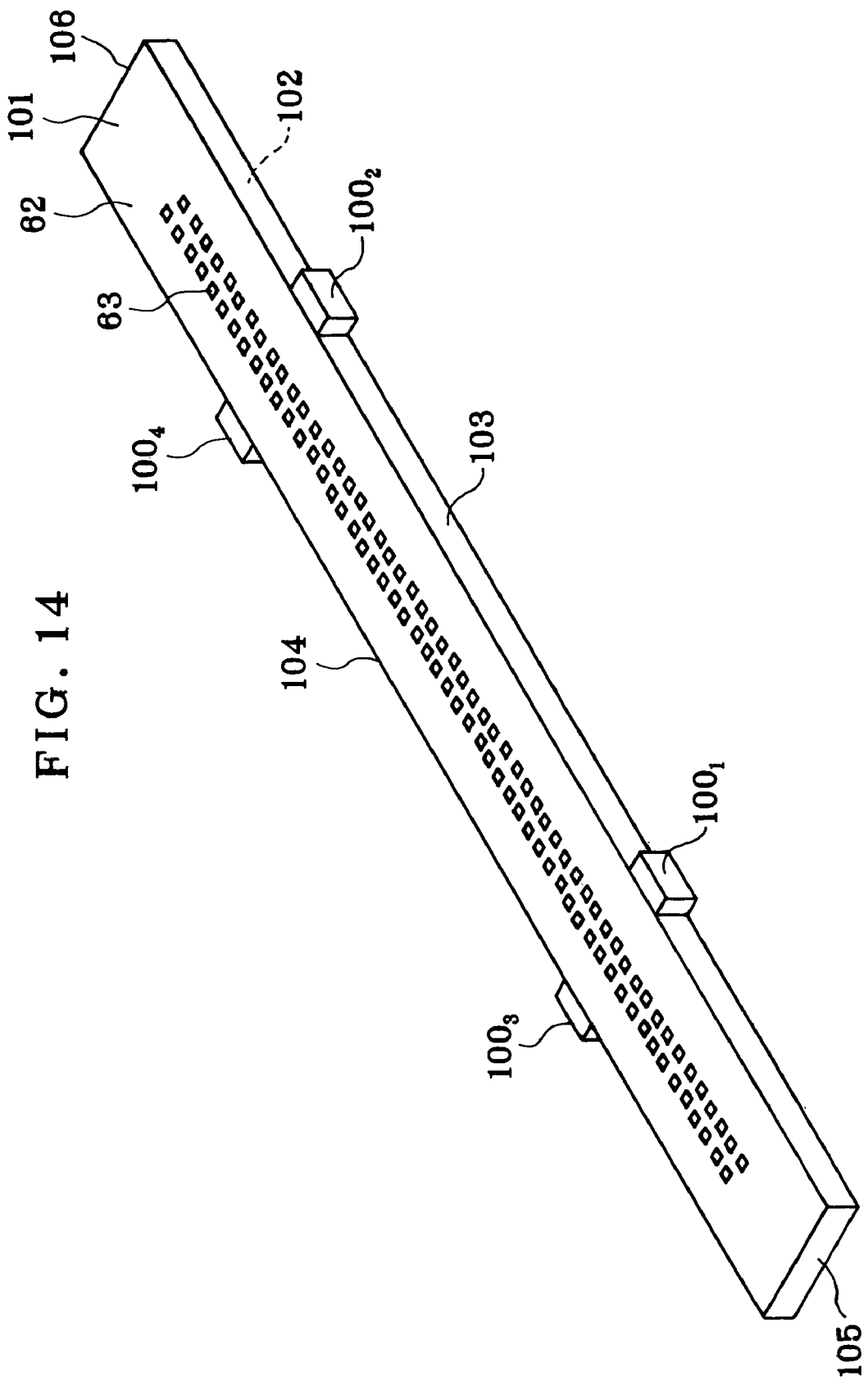
FIG. 14 is a perspective view showing a variation example with different positions and a different number of light quantity sensors.

In the aforementioned embodiments, the light quantity sensor 100 is composed of a single light quantity sensor 100 disposed on the end face 103, in the sub-scanning direction, of the glass substrate 62 of the organic EL light emitting element array 61. However, the light quantity sensor 100 may be composed a plurality of sensors disposed at difference locations. In the embodiment of FIG. 14, the light quantity sensor 100 is composed of four light quantity sensors $100_1$, through $100_4$ 4 of which two are disposed on each of the both end faces 103 and 104, in the sub-scanning direction.

As shown in FIG. 10 and FIG. 14, since the case that the light quantity sensor 100 or the light quantity sensors $100_1$ through $100_4$ are located on the end faces 103, 104, in the sub-scanning direction, of the glass substrate 62 allows the light quantity sensor 100 or the light quantity sensors $100_1$ through $100_4$ to be located nearer to the light emitting parts 63, there is a merit that the detected light quantity can be increased. It should be noted that, in the case using the plural light quantity sensors $100_1$ through $100_4$, various changes may be made. For example, a total of the detected values of the respective light quantity sensors $100_1$ through $100_4$ may be used the aforementioned detected value "Phn" or a detected value of the nearest sensor of the light quantity sensors $100_1$ through $100_4$ may be used as the value "Phn".

Figure 15:
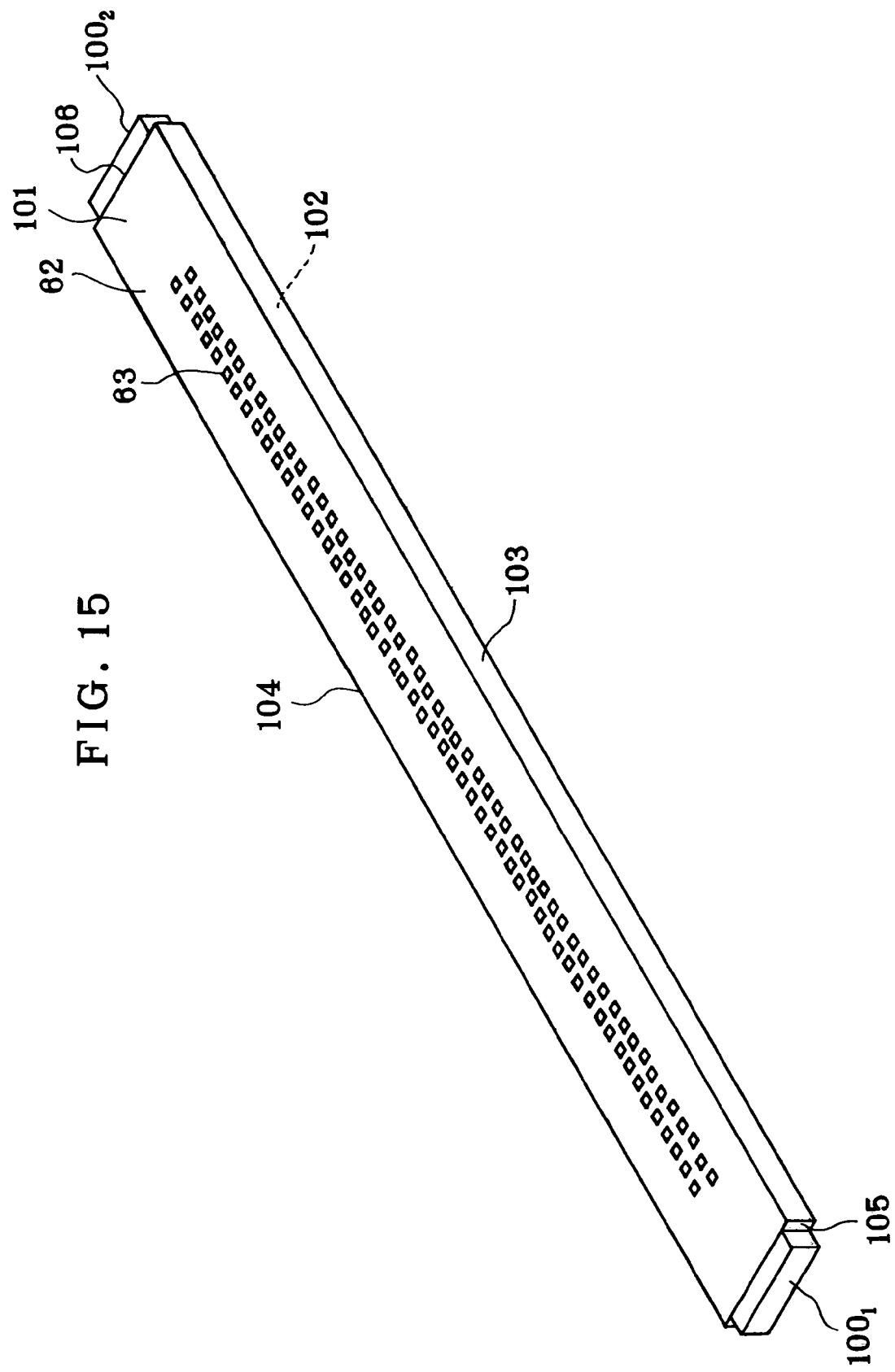
FIG. 15 is a perspective view showing another variation example with different positions and a different number of light quantity sensors.

The light quantity sensor 100 may be disposed on end face(s), in the main scanning direction, of the glass substrate 62 of the organic EL light emitting element array 61. In FIG. 15, two light quantity sensors $100_1$, $100_2$ are disposed on the both end faces 105 and 106, in the main scanning direction, of the glass substrate 62 of the organic EL light emitting element array 61. According to this structure and using a total of the detected values of the light quantity sensors $100_1$ and $100_2$ as the value "Phn", the detection with substantially uniform detected light quantity can be achieved relative to all of the light emitting parts 63. Also in this case, various changes may be made, for example, a detected value of the nearest sensor of the light quantity sensors $100_1$ and $100_2$ may be used as the value "Phn". Of course, only one of the light quantity sensors $100_1$, $100_2$ may be disposed on one of the end faces 105, 106, in the main scanning direction.

In case that the light quantity sensors $100_1$ and $100_2$ are located on the end faces 105, 106, in the main scanning direction, of the glass substrate 62, the size in the sub-scanning direction of the image writing means 23 having a line shape can be reduced, thereby achieving a compact line head (exposure head) 23.

As described above, according to the exposure head of the first embodiment of the present invention and the image forming apparatus employing the same, a transparent substrate has plain faces substantially parallel to each other. One of the faces is a face on which the light emitting parts are formed and the other is a face from which light beams are projected. The transparent substrate is provided, at position(s) other than the face on which the light emitting parts are formed and than the face from which light beams are projected, with light quantity detecting means for detecting the quantity of light emitted from the light emitting parts. Therefore, it is possible to detect, at the position of the light quantity detecting means, light beams introduced by total internal reflection within the transparent substrate, thereby increasing the quantity of detected light and enabling the high-precision measurement of light quantity. As a result, even when there is a variation in light emitting characteristics among the light emitting parts and/or even when some light emitting parts are deteriorated, uniform distribution of light quantity can be obtained by control. In addition, this structure can reduce the number of light quantity detecting means which are conventionally disposed corresponding to the respective light emitting parts, thereby simplifying the structure of the exposure head and reducing the cost.

Figure 17:
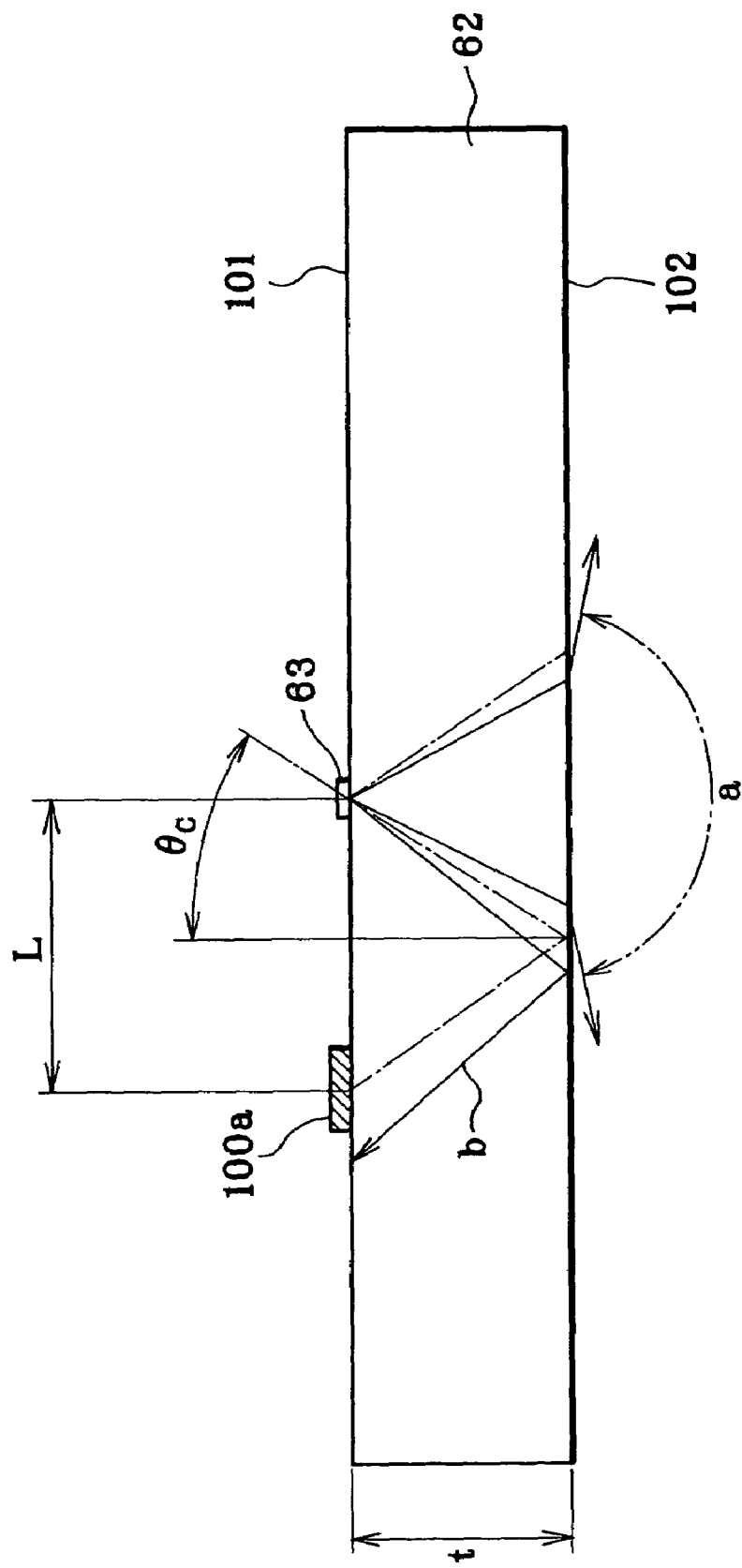
FIG. 17 is a sectional view of a glass substrate of an organic EL light emitting element array in the sub-scanning direction.
Figure 18:
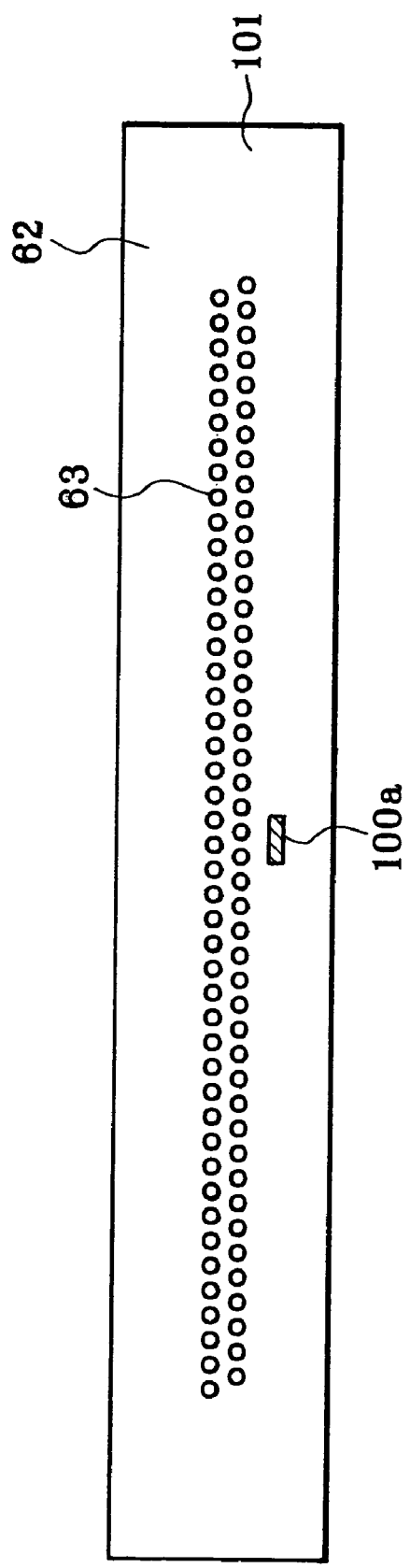
FIG. 18 is a plan view of the glass substrate shown in FIG. 17.

FIG. 17 through FIG. 24 show exposure heads of the second and third embodiments of the present invention. A difference from the exposure heads shown in FIG. 9 through FIG. 12, FIG. 14, and FIG. 15 is the mounting position of the light quantity sensor 100a. FIG. 17 is a sectional view of a glass substrate of an organic EL light emitting element array in the sub-scanning direction, FIG. 18 is a plan view of the glass substrate shown in FIG. 17. In the exposure head of the second embodiment, similar to the embodiment shown in FIG. 10, a light quantity sensor 100a composed of photo acceptance unit such as photodiode is attached to a predetermined location in the sub-scanning direction on the face 101, on which the light emitting parts 63 are disposed, of the glass substrate 62 of the organic EL light emitting element array 61 so that light beams "b" introduced within the transparent substrate from the light emitting part 63 by the total internal reflection are incident on the light quantity sensor 100a, thereby detecting the relative quantity of light emitted from the light emitting part 63.

Figure 19:
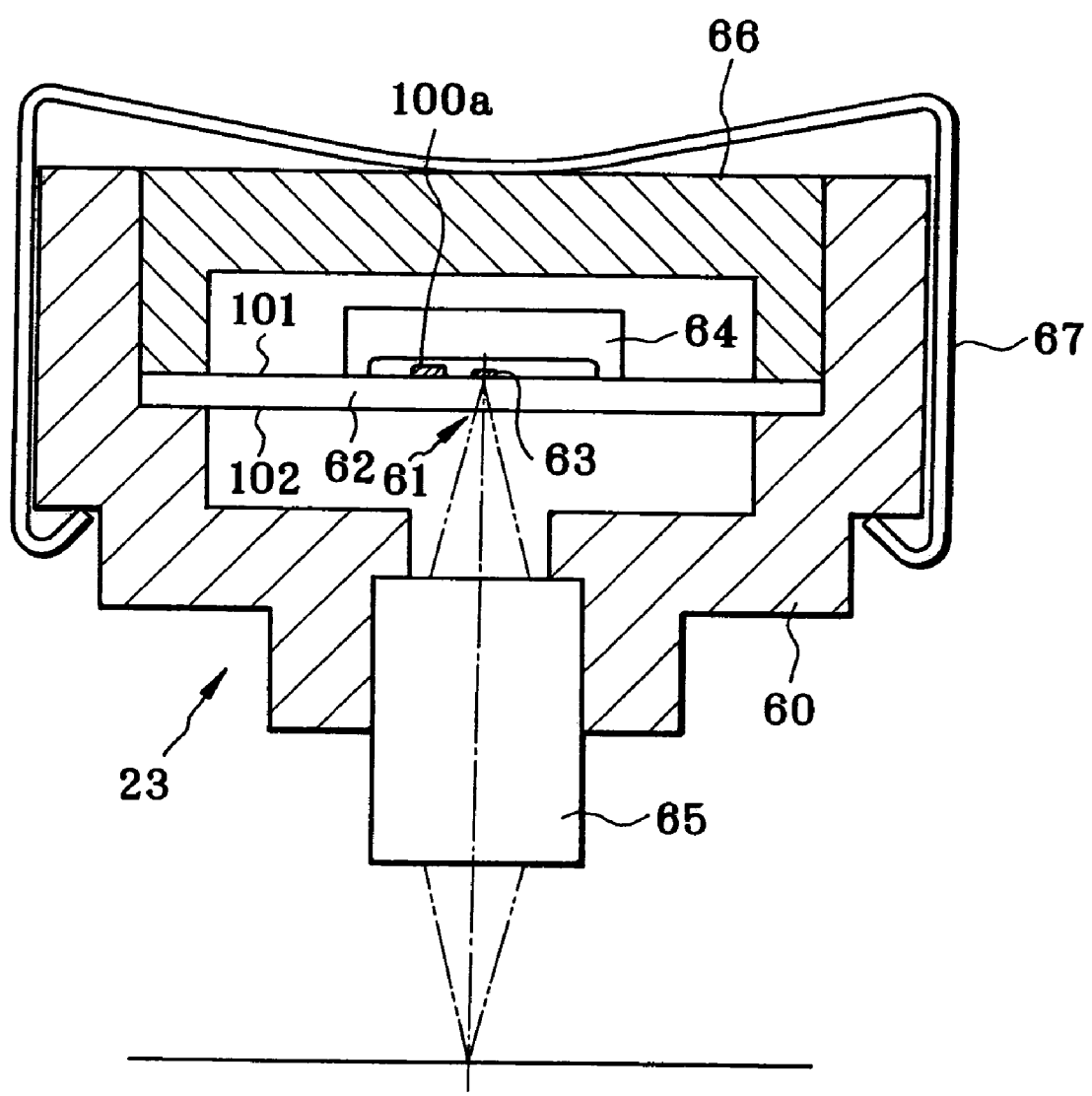
FIG. 19 is a sectional view of image writing means in case of FIG. 17, FIG. 18.
Figure 20:
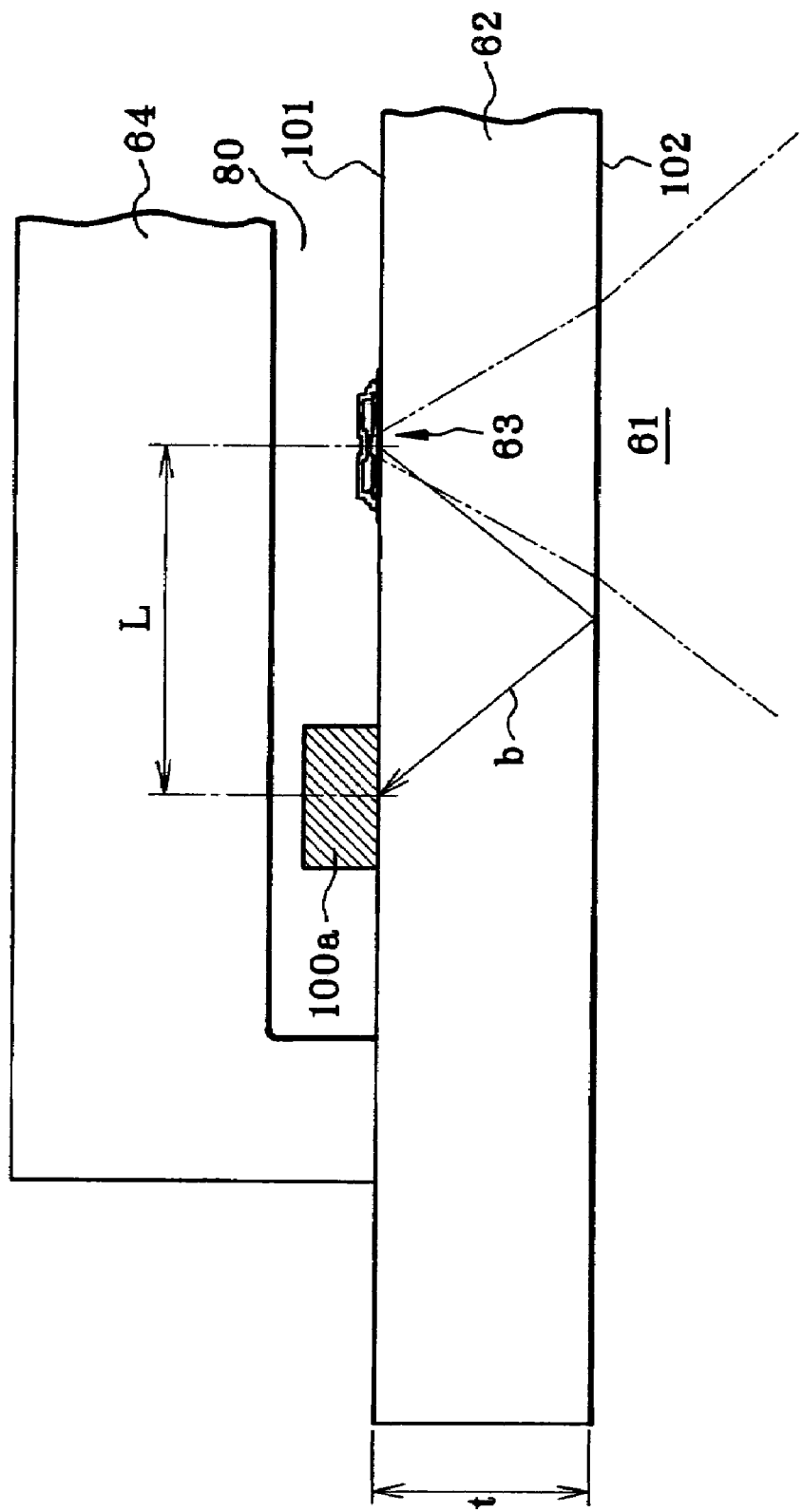
FIG. 20 is a sectional view of a portion from the vicinity of a light emitting part of the organic EL light emitting element array to the light quantity sensor of the image writing means shown in FIG. 19.

As for the exposure head of the second embodiment, a relation of the following equation is preferably satisfied:

$$L \geq 2t \cdot \tan \theta c \qquad (1)$$

wherein the thickness of the glass substrate 62 is "t", the critical angle of the glass substrate 62 is "$\theta c$", and the distance between the center of the light emitting part 63 nearest to the light quantity sensor 100a and the center of the light quantity sensor 100a is "L". As the above relation is satisfied, light beams "b" from all of the light emitting parts 63 of the organic EL light emitting element array 61 can be detected because the light beams reach the light quantity sensor 100a after totally reflected at the projection-side face 102 once or more. For example, when the thickness "t" of the glass substrate 62 is 0.5 mm and the refractive index "n" of the glass substrate 62 is 1.52, the critical angle "$\theta c$" of the glass substrate 62 is 41.4°. According to the above equation (1), the light quantity sensor 100a is disposed at a position $L \geq 0.87$ mm. FIG. 19 is a sectional view similar to FIG. 6, but showing the image writing means 23 in the aforementioned case, and FIG. 20 is a sectional view of a portion from the vicinity of a light emitting part 63 of the organic EL light emitting element array 61 to the light quantity sensor 100a of the image writing means 23 shown in FIG. 19.

According to the light quantity data detected by the light quantity sensor 100a, the quantity of light emitted by each light emitting part 63 of the organic EL light emitting element array 61 is stably controlled to a certain quantity, thereby preventing the unevenness of density of each light emitting part 63. Also in the exposure head of the second embodiment, the aforementioned respective correction coefficients Pgn/Phn are obtained and stored in the memory 124. The respective light emitting parts 63 of the organic EL light emitting element array 61 of each image writing means 23 are turned on to emit light via a control circuit 122 and a driving circuit 123 based on the initial value data stored in the memory 124. The light quantity at this time is measured by the light quantity sensor 100a. The light quantity at the image position of each light emitting part 63 is calculated by multiplying the measured light quantity by the correction coefficient Pgn/Phn.

A difference is obtained by comparing the calculated light quantity to the desired light quantity given by a controller 121 disposed in the electrical component box 5. Based on the difference, the volume of current to be supplied to the light emitting element of the organic EL light emitting element array 61 is controlled so that the light emitting quantity of each light emitting part 63 is adjusted to be desired light quantity. This adjusting operation is repeatedly conducted for every light emitting element, whereby the light quantities of all of the light emitting elements are adjusted to the desired value.

The aforementioned light quantity correction operation can be conducted according to the command from the controller 121 at any point in time just after the start-up of the image forming apparatus 1, just before printing operation, a period until the next paper.

Instead of obtaining and storing the correction coefficient Pgn/Phn into the memory 124 before the shipment of the image carrier unit 25, each light emitting part 63 of each light emitting element may be turned on in such a manner that the light quantity emitted from the light emitting part 63 becomes the desired light quantity at the image position corresponding to the image carrier 20, that is, in such a manner that the "Pgn" becomes a predetermined value, and the value "Phn" detected by the light quantity sensor 100a at this time may be stored. In this case, each light emitting part 63 is turned on according to the initial value data stored in the memory 124 so as to obtain the value measured by the light quantity sensor 100a. By comparing the measured value to the "Phn" stored in the memory 124 to obtain a difference therebetween and controlling the volume of current to be supplied to the light emitting element of the organic EL light emitting element array 61 to eliminate the difference, the quantity of light emitted by each light emitting part 63 is adjusted to be the desired quantity.

Though the memory 124 in which the correction coefficient Pgn/Phn of each light emitting part 63 or the value Phn detected by the light quantity sensor 100a when the light emitting parts emit light of desired quantity are stored is arranged in the image writing means 23 as the aforementioned embodiments, the memory 124 may be connected to the controller 121 of the electrical component box 5 of the apparatus body and arranged on the apparatus body side.

As the correction coefficient Pgn/Phn of each light emitting part 63 or the value Phn when the light emitting parts emit light of desired quantity are stored in the image writing means 23 or the apparatus body, even when there is variation in light emitting characteristic among the respective light emitting parts 63 and/or even when the organic EL light emitting element is deteriorated with ultraviolet rays of outside light or with heat such as from a heat source of the fixing unit 12, uniform distribution of light quantity can be obtained by control.

Figure 21:
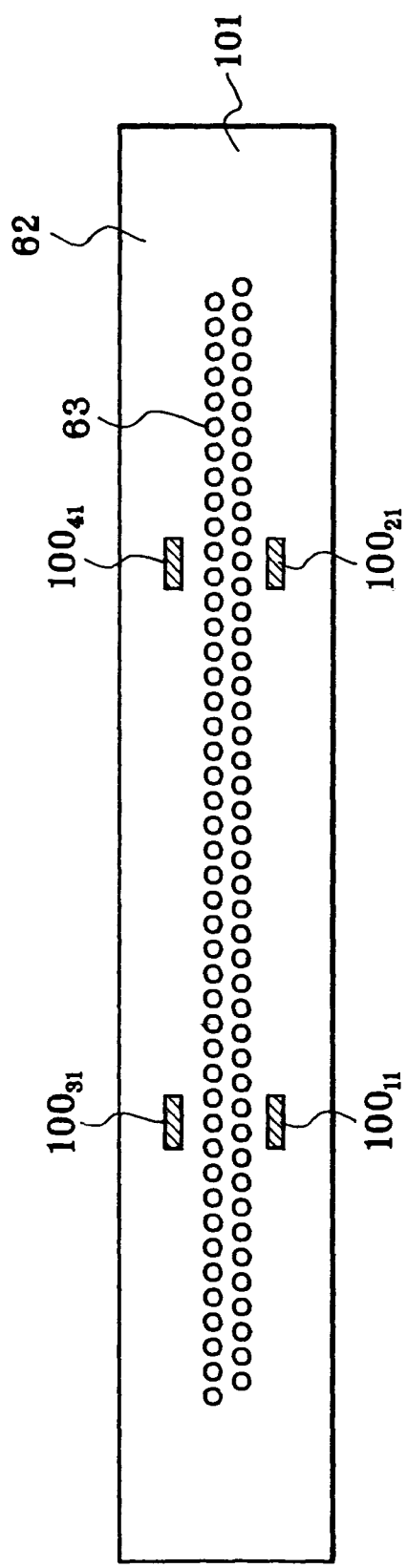
FIG. 21 is a perspective view showing a variation example with different positions and a different number of light quantity sensors.

In the aforementioned embodiments, the light quantity sensor 100a is composed of a single light quantity sensor 100a disposed at the predetermined position in the sub-scanning direction on the face 101, on which the light emitting parts 63 are disposed, of the glass substrate 62 of the organic EL light emitting element array 61. However, the light quantity sensor 100a may be composed a plurality of sensors disposed at difference locations. In the embodiment of FIG. 21, the light quantity sensor 100a is composed of four light quantity sensors $100_{11}$ through $100_{41}$ of which two are disposed on each of both sides, relative to the light emitting parts 63 in the sub-scanning direction, of the face 101 on which the light emitting parts 63 are disposed.

As shown in FIG. 18 and FIG. 21, since the case that the light quantity sensor 100a or the light quantity sensors $100_{11}$ through $100_{41}$ are located at the predetermined positions in the sub-scanning direction on the face 101 on which the light emitting parts 63 are disposed, allows the light quantity sensor 100a or the light quantity sensors $100_{11}$ through $100_{41}$ to be located nearer to the light emitting parts 63, there is a merit that the detected light quantity can be increased. It should be noted that, in the case using the plural light quantity sensors $100_{11}$ through $100_{41}$, various changes may be made. For example, a total of the detected values of the respective light quantity sensors $100_{11}$ through $100_{41}$ may be used the aforementioned detected value "Phn" or a detected value of the nearest sensor of the light quantity sensors $100_{11}$ through $100_{41}$ may be used as the value "Phn".

Figure 22:
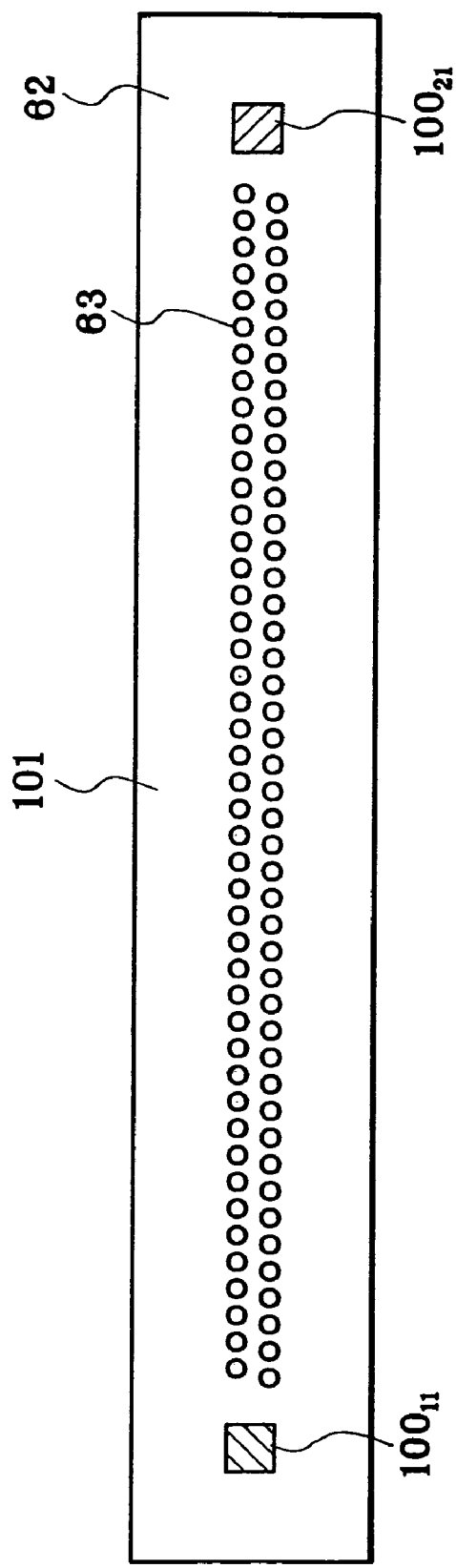
FIG. 22 is a plan view showing another variation example with different positions and a different number of light quantity sensors.

The light quantity sensor may be disposed on end portions(s) in the main scanning direction on the face 101, on which the light emitting parts 63 are disposed, of the glass substrate 62 of the organic EL light emitting element array 61. In FIG. 22, two light quantity sensors $100_{11}$, $100_{21}$ are disposed at positions, corresponding to the both end portions relative to the light emitting parts 63 in the main scanning direction, on the face 101 with the light emitting parts 63 of the glass substrate 62 of the organic EL light emitting element array 61. According to this structure and using a total of the detected values of the light quantity sensors $100_{11}$ and $100_{21}$ as the value "Phn", the detection with substantially uniform detected light quantity can be achieved relative to all of the light emitting parts 63. Also in this case, various changes may be made, for example, a detected value of the nearest sensor of the light quantity sensors $100_{11}$ and $100_{21}$ may be used as the value "Phn". Of course, only one of the light quantity sensors $100_{11}$, $100_{21}$ may be disposed on one of the end portions in the main scanning direction.

In case that the light quantity sensors $100_{11}$ and $100_{21}$ are located at the end portions in the main scanning direction on the face 101, on which the light emitting parts 63 are disposed, of the glass substrate 62, the size in the sub-scanning direction of the image writing means 23 having a line shape can be reduced, thereby achieving a compact line head (exposure head) 23.

Figure 23:
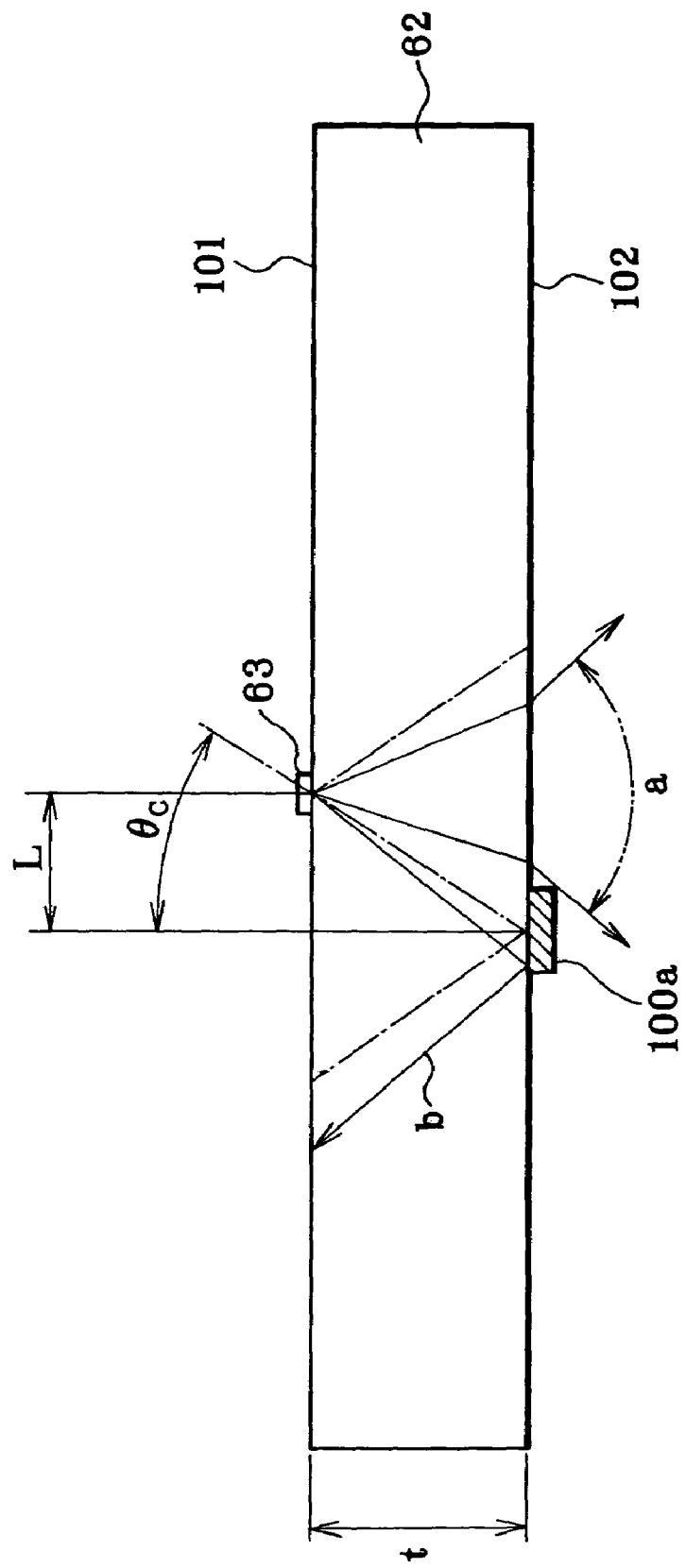
FIG. 23 is a similar view as FIG. 17, but showing another embodiment with a different position of a light quantity sensor.

The light quantity sensor may be disposed on the projection side face 102 opposite to the face 101, on which the light emitting parts 63 are disposed, of the glass substrate 62 of the organic EL light emitting element array 61 to detect light beams "b" totally reflected within the glass substrate 62. This case is shown in FIG. 23 and FIG. 24 which are similar to FIG. 17 and FIG. 20, respectively. In the exposure head of this embodiment, a light quantity sensor 100a composed of photo acceptance unit such as photodiode is attached to a predetermined location, in the sub-scanning direction, of the projection-side face 102 of the glass substrate 62 of the organic EL light emitting element array 61 with optical adhesive so as to reduce the interface reflection at the location so that light beams "b" directly from the light emitting part 63 are incident on the light quantity sensor 100a, thereby detecting the relative quantity of light emitted from the light emitting part 63.

As for the exposure head of the third embodiment, the following relation is preferably satisfied:

$$L \geq t \cdot \tan \theta c \quad (2)$$

wherein the thickness of the glass substrate 62 is "t", the critical angle of the glass substrate 62 is "θc", and the distance between the center of the light emitting part 63 nearest to the light quantity sensor 100a and the center of the light quantity sensor 100a is "L". As the above relation is satisfied, light beams "b" from all of the light emitting parts 63 of the organic EL light emitting element array 61 can be detected because the light beams reach the light quantity sensor 100a directly or after repetitions of total internal reflection.

In case employing a plurality of light quantity sensors, some of the light quantity sensors may be disposed on the face, on which the light emitting parts 63 are disposed, of the glass substrate 62 of the organic EL light emitting element array 61 and the rest may be the projection-side face 102 opposite to the face 101, on which the light emitting parts 63 are disposed, of the glass substrate 62. In this case, of course, the position of the light quantity sensor on the surface 101, on which the light emitting parts 63 are disposed, may be defined to satisfy the equation (1) and the position of the light quantity sensor on the projection-side surface 102 may be defined to satisfy the equation (2).

As apparent from the aforementioned description, according to the exposure head of the second or third embodiment of the present invention and the image forming apparatus employing the same, a transparent substrate has plane faces substantially parallel to each other, one of the faces being a face on which the light emitting parts are formed and the other being a face from which light beams are projected, and is provided, on the face on which the light emitting parts are formed, with light quantity detecting means for detecting the quantity of light emitted from the light emitting parts such that the light quantity detecting means are positioned to satisfy the relation of the equation (1), or alternatively, is provided, on the face from which light beams are projected, with light quantity detecting means for detecting the quantity of light emitted from the light emitting parts such that the light quantity detecting means are positioned to satisfy the relation of the equation (2). Therefore, it is possible to detect, at the position of the light quantity detecting means, light beams introduced by total internal reflection within the transparent substrate, thereby increasing the quantity of detected light and enabling the high-precision measurement of light quantity. As a result, even when there is a variation in light emitting characteristics among the light emitting parts and/or even when some light emitting parts are deteriorated, uniform distribution of light quantity can be obtained by control. In addition, this structure can reduce the number of light quantity detecting means which are conventionally disposed corresponding to the respective light emitting parts, thereby simplifying the structure of the exposure head and reducing the cost.

Though the exposure head of the present invention and the image forming apparatus employing the same have been described with reference to some embodiments disclosed above, the present invention is not limited thereto and various changes may be made therein.

We claim:

1. An exposure head comprising:
   a plurality of light emitting parts which are formed into an array configuration such that the light emitting parts are aligned in lines in the main scanning direction on a transparent substrate, the exposure head projecting modulated light beams from said light emitting parts to an image carrier so as to form a predetermined pattern on said image carrier, the light beams from said light emitting parts being projected on said image carrier side through said transparent substrate,
   wherein:
   said transparent substrate has plane faces substantially parallel to each other,
   one of the faces being a face on which the light emitting parts are formed and the other being a face from which light beams are projected,
   said transparent substrate is provided with a single light quantity detecting means for detecting the quantity of light emitted from said light emitting parts, at one or more positions other than the face on which the light emitting parts are formed and other than the face from which light beams are projected, said light emitting parts are light emitting parts of organic EL light emitting elements, and said single light quantity detecting means is disposed on one of the end faces in the main scanning direction of said transparent substrate and said single light quantity detecting means detects the quantity of light emitted from a plurality of said light emitting parts.

2. An exposure head as claimed in claim 1, wherein said single light quantity detecting means is disposed on an end face, in the sub-scanning direction, of said transparent substrate.

3. An exposure head as claimed in claim 1, wherein:

said single light quantity detecting means is disposed on a first one of the end faces, in the main scanning direction, of said transparent substrate, and a second light quantity detecting means is disposed on a second one of the end faces, in the main scanning direction, of said transparent substrate.

4. An exposure head as claimed in claim 1, wherein a plurality of additional light quantity detecting means are disposed at a plurality of positions on end faces of said transparent substrate.

5. An exposure head as claimed in claim 1, wherein end faces of said transparent substrate, on which no light quantity detecting means is disposed, have light reflectivity.

6. The exposure head as claimed in claim 5, wherein the light reflectivity is provided by a light reflective layer provided on said end faces on which no light quantity detecting means is disposed.

7. An exposure head as claimed in claim 1, wherein the quantity of light emitted from each said light emitting part is corrected on the basis of a light quantity detected signal detected by said single light quantity detecting means or on the basis of a light quantity detected signal which is a total of light quantity detected signals detected by a plurality of said light quantity detecting means.

8. An exposure head as claimed in claim 1, comprising a storage means of storing correction coefficients for correcting the quantities of light emitted from said light emitting parts.

9. A color image forming apparatus of a tandem type comprising at least two image forming stations each having a charging means, an exposure head as claimed in claim 1, and a toner developing means, and a transfer means which are arranged around the image carrier, and forming a color image by passing a transfer medium through the respective stations.

10. A color image forming apparatus as claimed in claim 9, further comprising a fixing means of fusing and fixing a toner image transferred from said transfer medium to a recording medium.

11. A color image forming apparatus as claimed in claim 9, further comprising a storage means for storing correction coefficients for correcting the quantities of light emitted from said light emitting parts.

12. An exposure head comprising:

light emitting parts formed into an array configuration on a transparent substrate, the exposure head projecting modulated light beams from said light emitting parts to an image carrier so as to form a predetermined pattern on said image carrier, the light beams from said light emitting parts being projected on said image carrier side through said transparent substrate, wherein:

said transparent substrate has plane faces substantially parallel to each other, one of the faces being a face on which the light emitting parts are formed and the other being a face from which light beams are projected, said transparent substrate is provided with light quantity detecting means for detecting the quantity of light emitted from said light emitting parts on the face on which the light emitting parts are formed, and said light quantity detecting means is positioned to satisfy a relation of the following equation:

$L > 2t \cdot \tan \theta c$ where the thickness of said transparent substrate is "t", the critical angle of said transparent substrate is "θc", and the distance between the center of the light emitting part nearest to said light quantity detecting means and the center of said light quantity detecting means is "L".

13. An exposure head comprising:

light emitting parts formed into an array configuration on a transparent substrate, the exposure head projecting modulated light beams from said light emitting parts to an image carrier so as to form a predetermined pattern on said image carrier, the light beams from said light emitting parts being projected on said image carrier side through said transparent substrate, wherein:

said transparent substrate has plane faces substantially parallel to each other, one of the faces being a face on which the light emitting parts are formed and the other being a face from which light beams are projected, said transparent substrate is provided with light quantity detecting means for detecting the quantity of light emitted from said light emitting parts on the face from which light beams are projected, and said light quantity detecting means is positioned to satisfy a relation of the following equation:

$L > t \cdot \tan \theta c$ wherein the thickness of said transparent substrate is "t", the critical angle of said transparent substrate is "θc", and the distance between the center of the light emitting part nearest to said light quantity detecting means and the center of said light quantity detecting means is "L".

14. An exposure head as claimed in claim 12 or 13, wherein said light emitting parts are light emitting parts of organic EL light emitting elements.

15. An exposure head as claimed in claim 12 or claim 13, wherein said light quantity detecting means are disposed at a plurality of positions on the face on which said light emitting parts are formed or the face from which light beams are projected of said transparent substrate.

16. An exposure head as claimed in claim 12 or claim 13, wherein the quantity of light emitted from each said light emitting part is corrected on the basis of one of: a light quantity detected signal detected by said single light quantity detecting means, and a total of light quantity detected signals detected by a plurality of said light quantity detecting means.

17. An exposure head as claimed in claim 12 or claim 13, comprising a storage means of storing correction coefficients for correcting the quantities of light emitted from said light emitting parts.

18. A color image forming apparatus of a tandem type comprising at least two image forming stations each having a charging means, an exposure head as claimed in claim 12 or claim 13, a toner developing means, and a transfer means arranged around the image carrier, a color image being formed by passing a transfer medium through the at least two stations.

19. A color image forming apparatus as claimed in claim 18, further comprising a fixing means of fusing and fixing a toner image transferred from said transfer medium to a recording medium.

20. A color image forming apparatus as claimed in claim 18, further comprising a storage means for storing correction coefficients for correcting the quantities of light emitted from said light emitting parts.

* * * * *